United States Patent [19]

Chung et al.

[11] Patent Number: 5,244,590
[45] Date of Patent: Sep. 14, 1993

[54] VISCOSITY INDEX IMPROVER

[75] Inventors: David Y. Chung, Edison; Mark J. Struglinski, Bridgewater, both of N.J.

[73] Assignee: Exxon Chemical Patents Inc., Linden, N.J.

[21] Appl. No.: 728,489

[22] Filed: Jul. 11, 1991

Related U.S. Application Data

[62] Division of Ser. No. 420,791, Oct. 12, 1989, Pat. No. 5,068,047.

[51] Int. Cl.$^5$ ............... C10M 143/02; C08F 8/00; C08F 20/06; C08F 6/00
[52] U.S. Cl. ............................ 252/43; 252/55; 525/333.8; 526/318.6; 528/502
[58] Field of Search ............... 252/43, 55; 525/333.8; 526/318.6; 528/502

[56] References Cited

U.S. PATENT DOCUMENTS

| | | | |
|---|---|---|---|
| 3,313,793 | 4/1967 | De La Mare et al. | 260/94.7 |
| 3,316,177 | 4/1967 | Dorer, Jr. | 252/51.5 |
| 3,326,804 | 6/1967 | Shih-en Hu | 252/34 |
| 3,332,926 | 7/1967 | Baron et al. | 260/93.7 |
| 3,345,352 | 10/1967 | Baron et al. | 260/93.7 |
| 3,687,849 | 8/1972 | Abbott | 252/47.5 |
| 3,687,905 | 8/1972 | Dorer | 260/78.4 D |
| 3,769,216 | 10/1973 | Gordon et al. | 252/51.5 R |
| 4,074,033 | 2/1978 | Wolinski et al. | 526/47 |
| 4,089,794 | 5/1978 | Engel et al. | 252/51.5 A |
| 4,113,636 | 9/1978 | Engel et al. | 252/51.5 R |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,169,063 | 9/1979 | Kiovsky | 252/51.5 A |
| 4,171,273 | 10/1979 | Waldbillig et al. | 252/51.5 A |
| 4,201,732 | 5/1980 | Wolinski et al. | 525/363 |
| 4,219,432 | 8/1980 | Girgenti et al. | 252/51.5 A |
| 4,320,019 | 3/1982 | Hayashi | 252/51.5 A |
| 4,372,863 | 2/1983 | Elliott et al. | 252/55 |
| 4,516,104 | 5/1985 | McDermott | 336/206 |
| 4,517,104 | 5/1985 | Bloch et al. | 252/51.5 A |
| 4,632,769 | 12/1986 | Gutierrez et al. | 252/48.6 |
| 4,735,736 | 4/1988 | Chung | 525/301 |
| 4,743,391 | 5/1988 | Gordon et al. | 252/55 |
| 4,749,505 | 6/1988 | Chung et al. | 525/301 |
| 4,780,228 | 10/1988 | Gardiner et al. | 525/301 |
| 4,786,697 | 11/1988 | Cozewirth et al. | 252/43 |
| 4,789,714 | 12/1988 | Cozewirth et al. | 252/43 |
| 4,804,794 | 2/1989 | Ver Strate et al. | 585/12 |
| 4,900,461 | 2/1990 | Ver Strate et al. | 252/51.5 A |
| 4,925,579 | 5/1990 | Stemke | 252/55 |
| 4,963,279 | 10/1990 | Rosental et al. | 252/56 R |
| 4,966,722 | 10/1990 | Smith, Jr. | 252/56 R |
| 5,006,608 | 4/1991 | Gardiner et al. | 525/333.8 |
| 5,068,047 | 11/1991 | Chung et al. | 252/51.5 A |
| 5,118,433 | 6/1992 | Chung et al. | 252/51.5 A |
| 5,167,848 | 12/1992 | Chung et al. | 252/51.5 A |

FOREIGN PATENT DOCUMENTS

| | | |
|---|---|---|
| 2753569 | 7/1978 | Fed. Rep. of Germany . |
| 2845288 | 4/1979 | Fed. Rep. of Germany . |
| 3025274 | 1/1981 | Fed. Rep. of Germany . |
| 2423530 | 11/1979 | France . |
| 785496 | 12/1979 | South Africa . |
| 1578049 | 10/1980 | United Kingdom . |
| 2055852A | 3/1981 | United Kingdom . |

*Primary Examiner*—Jerry Johnson
*Attorney, Agent, or Firm*—T. V. Kowalchyn

[57] ABSTRACT

Degraded molecular weight copolymers of ethylene alpha-olefin are provided. The ethylene alpha-olefin copolymers, before degradation, are characterized by having a narrow molecular weight distribution and are comprised of intramolecularly heterogeneous and intermolecularly homogeneous copolymer chains. The degraded copolymers are useful as viscosity index improvers for oils.

34 Claims, No Drawings

VISCOSITY INDEX IMPROVER

This is a division of application Ser. No. 420,791, filed Oct. 12, 1989, now U.S. Pat. No. 5,068,047.

FIELD OF THE INVENTION

This invention relates to degraded ethylene copolymers of a certain specific type useful as viscosity index improver additives for oleaginous compositions such as, for example, lubricating oil and fuel compositions. More particularly, this invention is concerned with the reduction of the molecular weight of copolymers of ethylene and at least one other α-olefin, said copolymers having a narrow molecular weight distribution and being comprised of segmented copolymer chains with compositions which are intramolecularly heterogeneous and intermolecularly homogeneous. These degraded copolymers may be used as is as viscosity index improver additives, or they may be grafted with various grafting materials to provide materials useful as multifunctional viscosity index improver additives. Furthermore, the degraded grafted ethylene copolymers may be reacted with polyamines containing at least two reactive amine groups or polyols to provide materials useful as viscosity index improver-dispersant additives for oleaginous compositions.

BACKGROUND OF THE INVENTION

It is known that the viscosity index of an oleaginous composition such as lubricating oil can be increased or improved by incorporating therein certain polymeric materials which function as viscosity index improvers. Known viscosity index improvers include polyisobutene and copolymers of ethylene and other hydrocarbon olefins. It is also known that these viscosity index improvers can be grafted with grafting materials such as, for example, maleic anhydride and the grafted material then reacted with a polyamine or a polyol to form multifunctional viscosity index improvers.

Generally, the polymeric materials useful as viscosity index improvers are those having number average molecular weights of from about 15,000 to about 250,000, preferably from about 20,000 to about 150,000. However, some of such polymers having this molecular weight range are different to process, isolate and handle, or are relatively more expensive to produce than their higher molecular weight homologs. Therefore, with such polymers it is generally easier and more economical to form their higher molecular weight homologs, for example those having number average molecular weights of from about 30,000 to about 500,000, and then to degrade these high molecular weight polymers to the desired molecular weight.

It is known that olefin and di-olefin homopolymers and ethylene-α-olefin copolymers may be degraded, thereby reducing the molecular weight thereof. Such degradation is known to be accomplished, for example, by shear assisted oxidation of the polymers and copolymers in air in a mechanical mixer, such as in an extruder, masticator, Banbury mixer, rubber mill, or the like, and by heating the polymers and copolymers, sometimes in the presence of air. One such degradation process, which is described in U.S. Pat. No. 3,313,793, involves (a) the formation of a solution of a conjugated diene polymer, (b) combining therewith a peroxide and a copper source such as copper, a copper halide or a copper carboxylate, (c) heating the resulting mixture in the substantial absence of oxygen, and (d) recovering a diene polymer product having a substantially reduced average molecular weight.

U.S. Pat. No. 3,332,926 relates to the thermal degradation of polyolefins, including ethylene-propylene copolymers, to produce relatively low molecular weight polymers which are useful, for example, as wax substitutes, blending agents, coating compositions and, in general, in fields where hydrocarbon resins and waxes find utility. The process described in that patent comprises mixing a crystalline starting polymer with from 0.075% to 10% by weight of a metal salt or carboxylic acid and heating the mixture in an atmosphere which is substantially free from oxygen to a temperature of about 275° C. to 450° C., until a substantial reduction in the molecular weight of the polymer takes place.

U.S. Pat. No. 3,316,177 discloses a functional fluid containing a sludge inhibiting detergent comprising the polyamine salts of the reaction product of the maleic anhydride and an oxidized interpolymer of propylene and ethylene. The interpolymers from which the oxidized, degraded interpolymers are derived usually have molecular weights of at least about 50,000. The interpolymers are oxidized and degraded by heating them at a temperature of at least about 100° C. in the presence of oxygen or air. Such degradation usually is characterized by a substantial reduction of the molecular weight of the interpolymer.

U.S. Pat. No. 3,345,352 relates to a catalytic process for the thermal degradation of the polyolefins, including copolymers of ethylene and propylene. The degradation process involves heating a mixture of a crystalline polyolefin and an oxide or carbonate of an alkali metal, alkaline earth metal, or certain selected transition metals such as copper, iron, titanium, vanadium, etc. in an atmosphere substantially free of oxygen to a temperature of from 275° C. to 450° C. for a minimum time period of at least five minutes.

U.S. Pat. No. 3,687,849 relates to lubricants containing oil-soluble graft polymers derived from degraded ethylene-propylene interpolymers. The interpolymers from which the degraded polymers are derived usually have a molecular weight of about 50,000–800,000, and the degraded interpolymers are prepared by heating in the interpolymer, or a fluid solution of such interpolymer, in an inert solvent, at a temperature of at least about 140° C. in the presence of oxygen or air. The degradation of the interpolymer is characterized by a substantial reduction of its molecular weight. A similar disclosure is set forth in U.S. Pat. No. 3,687,905.

U.S. Pat. No. 3,769,216 relates to polymers which are produced by reacting a primary or secondary amine and a mechanically degraded, oxidized atactic ethylene propylene copolymer, and to automotive lubricating oils containing such polymers as antitarnish additives. The ethylene propylene copolymer is mechanically degraded in the presence of oxygen and in the absence of any solvent in a closed vessel equipped with shearing blades. A typical apparatus of this type is described as a device containing counter-rotating helical blades and known as a "Brabender Torque Rheometer."

U.S. Pat. No. 4,089,794 discloses ethylene copolymers derived from about 2 to 98 wt % ethylene, and one or more $C_3$ to $C_{28}$ α-olefins, for example ethylene-propylene, which are solution-grafted with an ethylenically unsaturated carboxylic acid material, and thereafter reacted with a polyfunctional material reactive with carboxyl groups. The resulting polymers are useful as dispersant additives for lubricating oils and hydrocarbon fuels, and as multifunctional viscosity index improvers if their molecular weight is above 10,000.

U.S. Pat. No. 4,113,636 discloses the mechanical degradation at elevated temperatures, and in the presence of air or oxygen-containing gas, of copolymers comprising about 68 to 80 mole % ethylene and one or more $C_3$–$C_8$ α-olefins to form an oxygenated-degraded polymer which is then reacted with an amine compound. The resulting aminated polymers are useful as viscosity index improving additives.

U.S. Pat. No. 4,074,033 and 4,201,732 relate to a process for improving the processability for high molecular weight neoprene polymers. The process comprises treating a solution of the polymers in an organic solvent with an organic peroxide, in the presence of oxygen, to reduce the molecular weight of the neoprene and to lower the viscosity of the solution. The process may be conducted at room temperature with or without agitation, and an accelerator such as a cobalt salt or other transition metal salt may be employed.

The concept of grafting high molecular weight ethylene and α-olefin copolymers, either degraded or undegraded, with acid moieties such as maleic anhydride, followed by reaction with an amine to form a composition useful as a multifunctional viscosity index improver, e.g., viscosity index improver-dispersant, oil additive is also known and in addition to being disclosed in some of the aforediscussed patents is also disclosed, inter alia, in the following disclosures:

U.S. Pat. No. 3,316,177 teaches ethylene copolymers such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxized polymer, which is grafted with maleic anhydride followed by reaction with polyalkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ mono carboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing, with maleic anhydride and then reacts with primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free radical initiator and then with mixtures of $C_4$ to $C_{12}$ n-alcohol and amine such as N-aminopropylmorphine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free-radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 grafts maleic anhydride on an ethylene-propylene copolymer with maleic anhydride at 150° to 210° C. followed by reaction with an amine having one primary or secondary group.

The early patents such as U.S. Pat. No. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reaction with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid of U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. Nos. 4,132,661; 4,160,739; 4,171,273; German No. P2753569.9; German No. 2,845,288; and French No. 2,423,530.

U.S. Pat. No. 4,516,104 and 4,632,769 represented a further improvement over the art in that they permitted the utilization of the generally less expensive polyamines having two primary amine groups, while achieving good dispersancy levels, inhibiting cross-linking and allowing initiator, e.g., peroxide, grafting in oil.

U.S. Pat. No. 4,517,104 discloses polymeric viscosity index (V.I.) improver-dispersant additives for petroleum oils, particularly lubricating oils, comprising a copolymer of ethylene with one or more $C_3$ to $C_{28}$ α-olefins, preferably propylene, which have been grafted with acid moieties, e.g., maleic anhydride, preferably using a free radical initiator in a solvent, preferably lubricating oil, and then reacted with a mixture of a carboxylic acid component, preferably in alkyl succinic anhydride and a polyamine having two or more primary amine groups. Or the grafted polymer my abe reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769 discloses oil soluble viscosity improving ethylene copolymers such as copolymers of ethylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking or gelling.

There is, however, a need to provide viscosity index (V.I.) improving additives, both viscosity index improver additives and multifunctional viscosity index-improver additives, which when incorporated into oleaginous compositions such as lubricating oil compositions provide oil compositions which exhibit improved or better low temperature viscometric properties than those of oil compositions containing conventional ethylene-alpha-olefin based viscosity index improvers or multifunctional viscosity index improvers.

The problem of providing V.I. improving oil additives capable of providing oleaginous compositions exhibiting low temperature viscometric properties is addressed in U.S. Pat. No. 4,804,794 which discloses segmented copolymers of ethylene and at least one other α-olefin monomer, each copolymer being intramolecularly heterogeneous and intermolecularly homogeneous and at least one segment of the copolymer, constituting at least 10% of the copolymer's chain, being a crystallizable segment. These copolymers are disclosed as exhibiting good mechanical properties such as good shear stability and as being useful V.I. improvers which provide lubricating oils having highly desirable viscosity and pumpability properties at low temperatures. However, these copolymers are disclosed as being V.I. improvers, and there is no disclosure of grafting said copolymers with an ethylenically unsaturated grafting material or of grafting said copolymers and then reacting the grafted copolymers with a polyamine or polyol to produce compositions of matter useful as multifunctional viscosity index improvers for oleaginous compositions. Nor is there any disclosure in this patent of degrading these copolymers to reduce their molecular weight. It is heretofore generally believed that degrading these ethylene-alpha-olefin copolymers disclosed in U.S. Pat. No. 4,804,794 to obtain copolymers of lower molecular weight would generally adversely affect, i.e., broaden, their narrow molecular weight distribution and affect their intramolecular heterogeneity and intermolecular homogeneity. This, it was believed, would have a concomitant deleterious affect upon their ability to provide oil compositions exhibiting improved low temperature viscometric properties. It was further generally believed that these ethylene copolymers could not be grafted with conventional ethylenically unsaturated grafting materials and then reacted with a polyamine or polyol without deleteriously or adversely affecting, i.e., broadening, their narrow molecular weight distribution (MWD) and affecting their intramolecular homogeneity and intramolecular homogeneity, thereby deleteriously and adversely affecting their property of providing oil compositions exhibiting improved low temperature viscometric properties. Indeed, degrading these copolymers to reduce their molecular weights broadens their narrow molecular weight distribution and affects their intramolecular homogeneity and intermolecular homogeneity. However, it has surprisingly and unexpectedly been discovered that these degraded copolymers, when added to oleaginous compositions, nevertheless provide oleaginous compositions exhibiting better low temperature viscometric properties than oleaginous compositions containing conventional ethylene-α-olefin copolymers, either degraded or undegraded, and, under certain circumstances, similar or substantially the same low temperature viscometric properties as oleaginous compositions containing the undegraded ethylene-alpha-olefin copolymers from which the degraded copolymers of the instant inventions are derived. These degraded copolymers can be derivatized or functionalized, i.e., grafted with grafting materials or grafted with grafting materials and then reacted with a polyamine containing at least two reactive amine groups or a polyol, to provide materials useful as multifunctional viscosity index improvers for oleaginous compositions. Oleaginous compositions containing these degraded derivatized copolymers also exhibit better low temperature viscometric properties than oleaginous compositions containing conventional derivatized ethylene-α-olefin copolymers.

SUMMARY OF THE INVENTION

The present invention is directed to oil soluble degraded ethylene copolymers useful as viscosity index improvers for oleaginous compositions such as lubricating oil compositions and fuel compositions. Another aspect of the present invention is directed to oil soluble degraded ethylene copolymers grafted with various grafting materials useful as viscosity index improvers and/or multifunctional viscosity index improvers in oleaginous composition. Yet another aspect of the instant invention is directed to oil soluble degraded ethylene copolymers grafted with various grafting materials and then reacted with polyamines containing at least two reactive amino groups or polyols useful as multifunctional viscosity index improvers for oleaginous compositions. Oleaginous compositions containing the compositions of matter of the instant invention, i.e., degraded ethylene copolymers, degraded ethylene copolymers grafted with grafting materials, or degraded ethylene copolymers grafted with grafting materials and then reacted with polyamine containing at least two reactive amino groups or polyol, exhibit improved or better low temperature viscometric properties than oleaginous compositions which do not contain any viscosity index improvers or multifunctional viscosity index improvers or oleaginous compositions which contain conventional ethylene copolymer based viscosity index improvers or multifunctional viscosity index improvers.

The undegraded copolymers which are degraded to form the degraded ethylene-alpha-olefin copolymers of the instant invention are disclosed in U.S. Pat. No. 4,804,794, which is incorporated herein by reference. These undegraded copolymers are segmented copolymers of ethylene and at least one other α-olefin monomer; each copolymer is intramolecularly heterogeneous and intermolecularly homogeneous and at least one segment of the copolymer, constituting at least 10% of the copolymer's chain, is a crystallizable segment. For the purpose of this application, the term "crystallizable segment" is defined to be each segment of the copolymer chain having a number-average molecular weight of at least 700 wherein the ethylene content is at least 57 wt. %. The remaining segments of the copolymer chain are herein termed the "low crystallinity segments" and are characterized by an average ethylene content of not greater than about 53 wt. %. Furthermore, the molecular weight distribution can be characterized by the ratios of various molecular weight averages. For example, an indication of a narrow MWD in accordance with the present invention is that the ratio of weight to number-average molecular weight ($\overline{M}_w/\overline{M}_n$) is less than 2. Alternatively, a ratio of the z-average molecular weigh to the weight-average molecular weight ($\overline{M}_z/\overline{M}_w$) of less than 1.8 typifies a narrow MWD in accordance with the present invention. It is known that a portion of the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, copolymers subject to degradation in order to reduce their molecular weight in accordance with the present invention are characterized by having at least one of $\overline{M}_w/\overline{M}_n$ less than 2 and $\overline{M}_z/\overline{M}_w$ less than 1.8. The copolymer comprises chains within which the ratio of the monomers varies along the chain length. To obtain the intramolecular compositional heterogeneity and narrow MWD, the copolymers are preferably made in a tubular reactor.

DETAILED DESCRIPTION OF THE INVENTION

In accordance with one aspect of the instant invention there are provided polymeric materials useful as V.I.-improvers for oleaginous compositions, particularly lubricating oils, which are comprised of certain specific types of ethylene and α-olefin copolymers which have been degraded to lower molecular weight copolymers.

More particularly, the undegraded polymeric materials which are subject to degradation are comprised of: copolymer of ethylene and at least one other α-olefin monomer, said copolymer comprising intramolecularly heterogeneous and intramolecularly homogeneous copolymer chains containing at least one crystallizable segment of methylene units and at least one low crystallinity ethylene-α-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene.

When the degraded ethylene copolymers of the instant invention are incorporated into oleaginous compositions such as lubricating oils the resultant oleaginous compositions exhibit better or improved low temperature viscometric properties than oleaginous composition containing conventional ethylene copolymer viscosity index improvers.

Ethylene and α-Olefin Copolymer

The undegraded ethylene-α-olefin copolymers which are degraded to form the copolymers of the instant invention which are useful as viscosity index improver additives are copolymers of ethylene with at least one other α-olefin comprised of segmented copolymer chains with compositions which are intramolecularly heterogeneous and intramolecularly homogeneous. These copolymers are described in U.S. Pat. No. 4,804,794, which is incorporated herein by reference.

For convenience, certain terms that are repeated throughout the present specification are defined below:

a. Inter-CD defines the compositions variation, in terms of ethylene content, among polymer chains. It is expressed as the minimum deviation (analogous to a standard deviation) in terms of weight percent ethylene, from the average ethylene composition for a given copolymer sample needed to induce a given weight percent of the total copolymer sample, which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt. %) ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight-average to number-average molecular weight, $\overline{M}_w/\overline{M}_n$, and z-average to weight-average molecular weight, $\overline{M}_z/\overline{M}_w$, where:

$$\overline{M}_w = \frac{\Sigma N_i M_i^2}{\Sigma N_i M_i}$$

$$\overline{M}_n = \frac{\Sigma N_i M_i}{\Sigma N_i}, \text{ and}$$

$$\overline{M}_z = \frac{\Sigma N_i M_i^3}{\Sigma N_i M_i^2}$$

wherein $N_i$ is the number of molecules of molecular weight $M_i$.

d. Viscosity Index (V.I.) is the ability of a lubricating oil to accommodate increases in temperature with a minimum decrease in viscosity. The greater this ability, the higher the V.I. Viscosity Index is defined by ASTM D2270.

This instant copolymers are segmented copolymers of ethylene and at least one other α-olefin monomer wherein the copolymer's chain contains at least one crystallizable segment of ethylene monomer units, as well be more completely described below, and at least one low crystallinity ethylene-α-olefin copolymer segment, where in the low crystallinity copolymer segment is characterized in the unoriented bulk state after at least 24 hours annealing by a degree of crystallinity of less than about 0.2% at 23° C., and wherein the copolymer's chain is intramolecularly heterogeneous and intramolecularly homogeneous, and has an MWD characterized by at least one of $\overline{M}_w/\overline{M}_n$ of less than 2 and $\overline{M}_z/\overline{M}_w$ of less than 1.8. The crystallizable segments comprise from about 10 to 90 wt. %, preferably from about 20 to 85 wt. %, of the total copolymer chain, and contain an average ethylene content which is at least about 57 wt. %, preferably at least about 62 wt. %, and more preferably at least about 63 wt. % and which is not greater than 95 wt. %, more preferably <85%, and most preferably <75 wt. % (e.g., from about 58 to 68 wt. %). The low crystallinity copolymer segments comprise from about 90 to 10 wt. %, preferably from about 80 to 15 wt. %, and more preferably from about 65 to 35 wt. %, of the total copolymer chain, and contain an average ethylene content of from about 20 to 53 wt. %, preferably from about 30 to 50 wt. %, and more preferably from about 35 to 50 wt. %. The copolymers comprise intramolecularly heterogeneous chain segments wherein at least two portions of an individual intramolecularly heterogeneous chain, each portion comprising at least 5 weight percent of the chain and having a molecular weight of at least 7000 contain at least 5 wt. % ethylene and differ in composition from one another by at least 5 weight percent ethylene, wherein the intramolecular compositional dispersity of the polymer is such that 95 wt. % of the polymer chains have a composition 15% or less different in ethylene from the average weight percent ethylene composition, and wherein the copolymer is characterized by at least one or a ratio of $\overline{M}_w/\overline{M}_n$ of less than 2 and a ratio of $\overline{M}_z/\overline{M}_w$ of less than 1.8.

As described above, the copolymers will contain at least one crystallizable segment rich in methylene units (hereinafter called an "M" segment) and at least one low crystallinity ethylene-α-olefin copolymer segment (hereinafter called a "T" segment). The copolymers may be therefore illustrated by copolymers selected from the group consisting of copolymer chain structures having the following segment sequences:

$$M-T, \quad (I)$$

$$T^1-(M-T^2)x, \text{ and} \quad (II)$$

$$T^1-(M^1-T^2)y-M^2 \quad (III)$$

wherein M and T are defined above, $M^1$ and $M^2$ can be the same or different and are each M segments, $T^1$ and $T^2$ can be the same or different and are each T segments, x is an integer of from 1 to 3 and y is an integer of 1 to 3.

In structure II (x=1), the copolymer's M segment is positioned between two segments, and the M segment can be positioned substantially in the center of the polymer chain (that is, the T and $T^2$ segments can be substantially the same molecular weight and the sum of the molecular weight of the $T^1$ and $T^2$ segments can be substantially equal to the molecular weight of the M segment), although this is not essential to the practice of this invention. Preferably, the copolymer will contain only one M segment per chain. Therefore, structures I and II (x=1) are preferred.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain.

As will be shown below, a copolymer of the structure $$M^1-(T-M^2)_z \quad (IV)$$

(wherein $M^1$, $M^2$ and T are as defined above, and wherein z is an integer of at least 1 ) are undesirable as viscosity modifier polymers. It has been found that solutions of structure IV copolymers in oil tend to gel even when the M and T portions have exactly the same composition and molecular weight as structure II copolymers (with x=z=1). It is believed this poor viscosity modifier performance is due to the inability of a center T segment to sterically stabilize against association.

The M segments of the copolymers of this invention comprise ethylene and can also comprise at least one other α-olefin, e.g., containing 3 to 18 carbon atoms. The T segments comprise ethylene and at least one other α-olefin, e.g., α-olefins containing 3 to 18 carbon atoms. The M and T segments can also comprise other polymerizable monomers, e.g., non-conjugated dienes or cyclic mono-olefins.

Since the present invention is considered to be most preferred in the context of ethylene-propylene (EPM) copolymers it will be described in detail in the context of EPM.

Copolymers which are to be degraded in accordance with the present invention are preferably made in a tubular reactor. When produced in a tubular reactor with monomer feed only at the tube inlet, it is known at the beginning of the tubular reactor, ethylene, due to its high reactivity, will be preferentially polymerized. The concentration of monomers in solution changes along the tube in favor of propylene as the ethylene is depleted. The result, with monomer feed only at the inlet, is copolymer chains which are higher in ethylene concentration in the chain segments grown near the reactor inlet (as defined at the point at which the polymerization reaction commences), and higher in propylene concentration in the chain segments formed near the reactor outlet. These copolymer chains are therefore tapered in composition. An illustrative copolymer chain of ethylene-propylene is schematically presented below with E representing ethylene constituents and P representing propylene constituents in the chain:

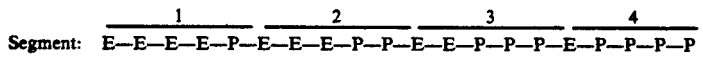

```
      1              2           3        4
Segment: E—E—E—E—P—E—E—E—P—P—E—E—P—P—P—E—P—P—P—P
```

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in the propylene. The resulting chain is intramolecularly heterogeneous.

The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of inter-chain variation. The Inter-CD can be characterized by the difference in composition between the copolymer fractions containing the highest and lowest quantity of ethylene. Techniques for measuring the breadth of the Inter-CD are known as illustrated in "Polymerization of ethylene and propylene to amorphous copolymers with catalysts of vanadium oxychloride and alkyl aluminum halides"; E. Junghanns, A. Gumboldt and G. Bier; Makromol. Chem., V. 58 (12/12/62): 18–42, wherein a p-xylene/-dimethylformamide solvent/non-solvent/non-solvent was used to fractionate copolymer into fractions of differing intermolecular composition. Other solvent/-non-solvent systems can be used as hexane/2 propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 wt. %.

Broadly, the Intra-CD of copolymer in accordance with the present invention is such that at least two portions of an individual intramolecularly heterogeneous chain, each portion comprising at least 5 weight percent of the chain, differ in composition from one another by at least 7 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

| A | EEEEPEEEPEEEPPEEPPEPPPEPPPPPPP |
|---|---|
| B | EEEEPEEEPEEEPPEEEPPPEPPPEEPPP |
| C | EEPEEEPEEEPEEEPEEEPPEEPPPEEPPP |

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%.

If the chains are broken into fragments, there will be a new Inter-CD. For simplicity, consider first breaking only molecule A into fragments shown by the slashes as follows:

EEEEP/EEEPE/EEPPE/EPPEP/-
PPEPP/PPPPP

Portions of 72.7%, 72.7%, 50%, 30.8%, 14.3% and 0% ethylene are obtained. If molecules B and C are similarly broken and the weight fractions of similar composition are grouped as new Inter-CD is obtained.

In order to determine the fraction of a polymer which is intramolecularly heterogeneous in a mixture of polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about 105, fragments of ca 5000 molecular weight are appropriate. A detailed mathematical analysis of plug flow or batch polymerization indicates that the rage of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 and in H. Inagaki, T. Tanaku, "Developments in Polymer Characterization", 3, 1, (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Furthermore, for crystalline segments, solubility is significantly reduced. Thus, the high molecular weight, high ethylene chains are easily separated on the basis of thermodynamics.

A fractionation procedure is as follows: Unfragmented polymer is dissolved in n-hexane at 23° C. to form ca a 1% solution (1 g. polymer100 cc hexane). Isopropyl alcohol is titrated into the solution until turbidity appears at which time the precipitate is allowed to settle. The supernatant liquid is removed and the precipitate is dried by pressing between Mylar polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5-10% by weight of the original polymer, especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. (The time or temperature can be empirically adjusted based on the ethylene content and molecular weight of the polymer.) This should be adequate to reduce a 105 molecular weight polymer to fragments of ca 5000 molecular weight. Such degradation does not substantially change the average ethylene content of the polymer, although propylene tends to be lost on scission in preference to ethylene. This polymer is fractionated by the same procedure as the high molecular weight precursor. Ethylene content is measured, as well as molecular weight on selected fractions.

The procedure to characterize intramolecular heterogeneity is laborious and even when performed at an absolute optimum, does not show how the segments of the chain are connected. In fact it is not possible, with current technology, to determine the polymer structure without recourse to the synthesis conditions. With knowledge of the synthesis conditions, the structure can be defined as follows.

Etheylene, propylene or high α-olefin polymerization with transition metal catalysts can be described by the terminal copolymerization model, to an approximation adequate for the present purpose. (G. Ver Strate, Encyclopedia of Polymer Science and Engineering, vol. 6, 522 (1986)). In this model, the relative reactivity of the two monomers is specified by two reactivity ratios defined as follows:

$$R_1 = \frac{\text{(rate constant for ethylene adding to ethylene)}}{\text{(rate constant for propylene adding to ethylene)}}$$

$$R_2 = \frac{\text{(rate constant for propylene adding to propylene)}}{\text{(rate constant for ethylene adding to propylene)}}$$

Given these two constants, at a given temperature, the ratio of the molar amount of ethylene, E, to the molar amount of propylene, P, entering the chain from a solution containing ethylene and propylene at molar concentrations [E] and [PO] respectively is $$\frac{E}{P} = \frac{[E]}{[P]} \cdot \frac{(R_1[E] + [P])}{([E] + R_2[P])} \tag{1}$$

The relation of E and P to the weight % ethylene in the polymer is as follows $$\text{weight \% ethylene} = \frac{E}{E + 1.5\,P} \cdot 100$$

The values of $R_1$ and $R_2$ are dependent on the particular comonomer and catalyst employed to prepare the polymer, the polymerization temperature and, to some extent, the solvent.

For all transition metal catalysts specified herein, $R_1$ is significantly larger than $R_2$. Thus, as can be seen from equation (1), ethylene will be consumed more rapidly than propylene for a given fraction of the monomer in the reacting medium. Thus, the ratio of [E]/[P] will decrease as the monomers are consumed. Only if $R_1 = R_2$ will the composition in the polymer equal that in the reacting medium.

If the amount of monomer that has reacted at a given time in a batch reactor or at a given point in a tubular reactor can be determined, it is possible through equation (1), to determine the instantaneous composition being formed at a given point along the polymer chain. Demonstration of narrow MWD and increasing MW along the tube proves the compositional distribution is intramolecular. The amount of polymer formed can be determined in either of two ways. Samples of the polymerizing solution may be collected, with appropriate quenching to terminate the reaction at various points along the reactor, and the amount of polymer formed evaluated. Alternatively, if the polymerization is run adiabatically and the heat of polymerization is known, the amount of monomer converted may be calculated from the reactor temperature profile.

Finally, if the average composition of the polymer is measured at a series of locations along the tube, or at various times in the batch polymerization case, it is possible to calculate the instantaneous composition of the polymer being made. This technique does not require knowledge of $R_1$ and $R_2$ or the heat of polymerization, but it does require access to the polymer synthesis step.

All of these methods have been employed with consistent results.

For the purpose of this patent, $R_1$ and $R_2$ thus simply serve to characterize the polymer composition in terms of the polymerization conditions. By defining $R_1$ and $R_2$, we are able to specify the intramolecular compositional distribution. In the examples shown below where $VCl_4$ and ethylaluminum sesquichloride are employed in hexane as solvent, $R_1 = 1.8 \exp(+500/RT_k)$ and $R_2 = 3.2 \exp(-1500/RT_k)$. Where "R" is the gas constant (1.98 cal/deg-mole) and "$T_k$" is degrees Kelvin. For reference, at 20° C. $R_1 = 9.7$, $R_2 = 0.02$.

The $R_1$ and $R_2$ given above predict the correct final average polymer composition. If the $R_1$ and $R_2$ and expression (2) are someday proven to be inaccurate the polymer intramolecular compositional distribution will remain as defined herein in terms of the polymerization conditions but may have to be modified on the absolute composition scales. There is little likelihood that they are in error by more than a few percent, however.

Ethylene content is measured by ASTM-D3900 for ethylene-propylene copolymers between 35 and 85%. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are. available; however, proton and carbon-13 nuclear magnetic resonance spectroscopy can be employed to determine the composition of such polymers. These are absolute techniques requiring no calibration when operated such that all nucleii of a given element contribute equally to the spectra. For ranges not covered by the ASTM tests for ethylene-propylene copolymers, these nuclear magnetic resonance methods can also be used.

Molecular weight and molecular weight distribution are measured using a Waters 150 C gel permeation chromatography equipped with a Chromatix KMX-6 (LDC-Milton Roy, Riviera Beach, Fla.) on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, copolymers in accordance with the present invention are comprised of ethylene and at least one other α-olefin. It is believed that such α-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene.

As is well known to those skilled in the art, copolymers of ethylene and higher α-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;

b. branched chain acyclic dienes such as: 5-methyl-1, 4-hexadiene; 3, 7-dimethyl-1,6-octadiene; 3, 7-dimethyl-1,7-octadiene and the mixed isomers of dihydro-mycene and dihydroocinene;

c. single ring alicyclic dienes such as: 1, 4-cyclohexadiene; 1,5-cyclooctadiene; and 1,5-cyclododecadiene;

d. multi-ring alicyclic fused and bridged ring dienes such as: tetrahydroindene; methyltetrahydroindene; dicyclopentadiene; bicyclo-(2,2,1)-hepta-2, 5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a stained ring are preferred. The most preferred diene is 5-ethylidene-2-norbornene (ENB). The amount of diene (st. basis) in the copolymer could be from about 0% to 20% with 0% to 15% being preferred. The most preferred range is 0% to 10%.

As already noted, the most preferred copolymer in accordance with the present invention is ethylene-propylene. The average ethylene content of the copolymer could be as low as about 20% on a weight basis. The preferred minimum is about 25%. A more preferred minimum is about 30%. The maximum ethylene content could be about 90% on a weight basis. The preferred maximum is about 85%, with the most preferred being about 80%. Preferably, the copolymers of this invention intended for use as viscosity modifier-dispersant contain from about 35 to 75 wt. % ethylene, and more preferably from about 50 to 70 wt. % ethylene.

The molecular weight of copolymer made in accordance with the present invention can vary over a wide range. It is believed that the number-average molecular weight could be as low as about 2,000. The preferred minimum is about 10,000. The most preferred minimum is about 20,000. It is believed that the maximum number-average molecular weight could be as high as about 12,000,000. The preferred maximum is about 1,000,000. The most preferred maximum is about 750,000. An especially preferred range of number-average molecular weight for copolymers to be degraded in accordance with the instant invention for use as viscosity modifiers is from about 50,000 to about 500,000.

The copolymers of this invention will also be generally characterized by a Mooney viscosity (i.e., ML(1+4,) 125° C.) of from about 1 to 100, preferably from about 5 to 70, and more preferably from about 8 to 65, and by a thickening efficiency ("T.E.") of from about 0.4 to 5.0, preferably from about 1.0 to 4.2, most preferably from about 1.4 to 3.9.

Another feature of copolymer of the present invention is that the molecular weight distribution (MWD) is very narrow, as characterized by at least one of a ratio of $\overline{M}_w/\overline{M}_n$ of less than 2 and a ratio $\overline{M}_z/\overline{M}_w$ of less than 1.8. As relates to EPM and EPDM, a typical advantage of such copolymers having narrow MWD is resistance to shear degradation. Particularly for oil additive applications, the preferred copolymers have $\overline{M}_w/\overline{M}_n$ less than about 1.5, with less than about 1.25 being most preferred. The preferred $\overline{M}_z\overline{M}_w$ is less than about 1.5, with less than about 1.2 being most preferred.

The copolymers of the instant invention may be produced by polymerization of a reaction mixture comprised of catalyst, ethylene and at least one additional α-olefin monomer, wherein the amounts of monomer, and preferably ethylene, is varied during the course of the polymerization in a controlled manner as will be hereinafter described. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These polymerizations are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product or chain segment. For economic reasons, a tubular reactor is preferred to a batch rector for carrying out the processes of this invention.

In addition to the importance of the reactor system to make copolymers in accordance with the present invention, the polymerization should be conducted such that:
(a) the catalyst system produces essentially one active catalyst species,
(b) the reaction mixture is essentially free of chain transfer agents, and
(c) the polymer chains are essentially all initiated simultaneously, which is at the same time for a batch reactor or at the same point along the length of the tube for a tubular reactor.

To prepare copolymer structures II and III above (and, optionally, to prepare copolymer structures I above), additional solvent and reactants (e.g., at least one of the ethylene, α-olefin and diene) will be added either along the length of a tubular reactor or during the course of polymerization in a batch reactor, or to selected stages of stirred reactors in series in a controlled manner (as will be hereinafter described) to form the copolymers of this invention. However, it is necessary to add essentially all of the catalyst at the inlet of the tube or at the onset of batch reactor operation to meet the requirement that essentially all polymer chains are initiated simultaneously.

Accordingly, polymerization in accordance with the present invention are carried out:
(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Since the tubular reactor is the preferred reactor system for carrying out polymerizations in accordance with the present invention, the following illustrative descriptions are drawn to that system, but will apply to other reactor systems as will readily occur to the artisan having the benefit of the present disclosure.

In practicing apolymerization processes in accordance with the present invention, use is preferably made of at least one tubular reactor. Thus, in its simplest form, such a process would make use of but a single, reactor. However, as would readily occur to the artisan having the benefit of the present disclosure, a series of reactors could be used with multiple monomer feed to vary intramolecular composition as described below.

The composition of the catalyst used to produce α-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethyolene-Propylene Copolymers. Reactivity Ratios, Evaluation and Significance", C. Cozewith and G. Ver Strate, *Macromolecules*, 4, 482 (1971), which is incorporated herein by reference.

It is disclosed by the authors that copolymers made in a continuous flow stirred reactor should have an MWD characterized by $\overline{M}_w/\overline{M}_n=2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight- to number-average ratio) for these samples approaches 2. It is this latter characteristic ($\overline{M}_w/\overline{M}_n$ of about 2) that is deemed the more important in identifying a single active catalyst species. On the other hand, other catalyst gave copolymer with an Inter-CD greater than ±10% about the average and multi-modal MWD often with $\overline{M}_w/\overline{M}_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I)A, II0A, II0B and III-A of the Periodic Table.

The preferred catalyst system in practicing processes in accordance with the present invention comprises hydrocarbon-soluble vandium compound in which the vanadium valence is 3 to 5 and an organo-aluminum compound, with the proviso that the catalyst yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

$$\overset{O}{\underset{\|}{V}}Cl_x(OR)_{3-x} \quad (1)$$

where $x=0-3$ and $R=$ a hydrocarbon radical;
$VCl_4$;
$VO(AcAc)_2$, where AcAc=acetyl acetonate which may or may not be alkyl-substituted (e.g. 1 to $C_6$ alkyl);
$V(AcAc)_3$;
$V(dicarbonyl\ moiety)_3$;
$VOCl_x(AcAc)_{3-x}$, where $x=1$ or 2;
$V(Dicarbonyl\ moiety)_3Cl$; and
$VCl_3.nB$, where $n=2-3$, B=Lewis base capable of making hydrocarbon-;soluble complexes with $VCl_3$, such as tetrahydrofuran, 2-methyl-tetrahydrofuran and dimethyl pyridine, and the dicarbonyl moiety is derived from a dicarbonyl compound of the formula:

$$R-\underset{\underset{O}{\|}}{C}-R'-\underset{\underset{O}{\|}}{C}-R$$

In formula (1) above, each R (which can be the same or different) preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. R, preferably represents an alkylene divalent radical of 1 to 6 carbons (e.g., $-CH_2-$, $-C_2H_4-$, etc.). Nonlimiting illustrative examples of formula (1) compounds are vanadyl trihalides, alkoxy halides and alkoxides such as $VOCl_3$, $VOCl_2$ (OBu) where Bu=butyl, and VO-$(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

| | |
|---|---|
| $AlR_3$, | $Al(OR)R_2$, |
| $AlR_2Cl$, | $R_2Al-AlR_2$, |
| $AlR,RCl$, | $AlR_2I$, |
| $Al_2R_3Cl_3$, | and |
| $AlRCl_2$, | | where R and R, represent hydrocarbon radicals, the same or different, as described above with respect to the vanadium compound formula. The most preferred organo-aluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred. The most preferred maximum is about 15.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

Chain transfer agents for the Ziegler-catalyzed polymerization of α-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD. Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum cocatalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessively elevated temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst systems the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 20° C. or below being most preferred.

Preferably, the catalyst components are premixed in the presence of the selected polymerization diluent or solvent under rapid mixing conditions, e.g., at impingement Reynolds Numbers (NRE) of at least 10,000, more preferably at least 50,000, and most preferably at least 100,000. Impingement Reynolds number is defined as $$N_{RE} = \frac{DN\rho}{\mu}$$

where N is fluid flow velocity (cm./sec.), D is inside tube diameter (cm), $\rho$ is fluid density (g/cm.$^3$) and $\mu$ is fluid viscosity (poise).

The temperature of the reaction mixture should also be kept within certain limits. The temperature at the reactor inlets should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50° C. to 150° C. It is believed that the outlet temperature of the reaction mixture could be as high as about 200° C. The preferred maximum outlet temperature is about 70° C. The most preferred maximum is about 60° C. In the absence of reactor cooling, such as by a cooling jacket, to remove the heat of polymerization, it has been determined (for a mid-range ethylene content EP copolymer and a solvent with heat capacity similar to hexane) that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 wt % ×13° C./wt. % =65° C. To maintain an outlet temperature of 35° C., it will thus require a feed that has been prechilled to 35° C.−65° C.=−30° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it s preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains but also to minimize radial temperature gradients due to the heat generated by the polymerization reaction. Radial temperature gradients in the case of multiple segment polymers will tend to broaden the molecular weight distribution of the copolymer since the polymerization rat is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 0.2 second. A preferred minimum is about 0.5 second. The most preferred minimum is about 1 second. It is believed that the maximum could be as high as about 3600 seconds. A preferred maximum is about 40 seconds. The most preferred maximum is about 20 seconds.

Preferably, the fluid flow of the polymerization reaction mass through the tubular reactor will be under turbulent conditions, e.g., at a flow Reynolds Number (NR) of at least 10,000, more preferably at least 50,000, and most preferably at least 100,000 (e.g., 150,000 to 250,000), to provide the desired radial mixing of the fluid in the reactor. Flow Reynolds Number is defined as $$NR = \frac{D'N'}{\mu}$$

wherein N' is fluid flow velocity (cm./sec.), D, is inside tube diameter of the reactor (cm.), is fluid density (g./cm.$^3$) and $\mu$ is fluid viscosity (poise).

If desired, catalyst activators for the selected vanadium catalysts can be used as long as they do not cause the criteria for a mix-free reactor to be violated, typically in amounts up to 20 mol %, generally up to 5 mol %, based on the vanadium catalyst, e.g., butyl perchlorocrotonate, benzoyl chloride, and other activators disclosed in U.S. Ser. Nos. 504,945 and 50,946, filed May 15, 1987, the disclosures of which are hereby incorporated by reference in their entirety. Other useful catalyst activators include esters of halogenated organic acids, particularly alkyl trichloroacetates, alkyl tribromoacetates, esters of ethylene glycol monoalkyl (particularly monoethyl) ethers with trichloroacetic acid and alkyl perchlorocrotonates, and acyl halides. Specific examples of these compounds include benzoyl chloride, methyl tri-chloroacetate, ethyl trichloroacetate, methyl tribromoacetate, ethyl tribromoacetate, ethylene glycol monoethyl ether trichloroacetate, ethylene glycol monoethyl ether tribromoacetate, butyl perchlorocrotonate and methyl perchlorocrotonate.

By practicing processes in accordance with the present invention, α-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPM and EPDM made in accordance with the present invention, the products have good shear stability and (with specific intramolecular CD) excellent low temperature properties which make them especially suitable for lube oil applications.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene. Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

DEGRADATION OF THE ETHYLENE AND ALPHA-OLEFIN COPOLYMER

The undegraded ethylene-α-olefin copolymers in accordance with the instant invention are degraded to lower molecular weight copolymers by any of the conventional and well-known degradation or molecular weight reduction processes. By degradation or molecular weight reduction processes is meant processes which reduce the molecular weight of the ethylene-α-olefin copolymers of this invention. These degradation processes are generally conventional and well known in the art. Included among these processes are mechanical degradation processes and thermal degradation processes. The mechanical degradation processes generally involve shear assisted breakdown of the copolymer. They may be carried out in the presence of oxygen or in an inert atmosphere, i.e., in the substantial absence of oxygen. They can be conducted in the presence or absence of catalysts and/or accelerators. While generally in mechanical processes the copolymer is either in the solid or melt phase, said processes may be conducted in the presence of solvent, preferably inert solvent.

In the mechanical degradation processes the degree of shear and heat utilized in the process and the length of time that the copolymers are subjected to said shear are those which are effective to degrade the copolymer, i.e., reduce the molecular weight of the copolymer to the desired molecular weight (e.g., $\overline{M}_n$ of about 15,000 to about 150,000) and thickening efficiency. If catalysts are utilized the amount of catalyst employed is a catalytic effective amount, i.e., an amount effective to catalyze the degradation reaction.

The thermal degradation processes may be carried out in the presence of oxygen, i.e., thermal oxidative degradation, or under an inert atmosphere, i.e., in the substantial absence of oxygen. They are generally, although not always, conducted on a composition comprising the copolymer and an inert solvent or diluent, e.g., copolymer-inert solvent solution. Various catalysts and/or accelerators may also be used in these thermal degradation processes.

The thermal degradation processes are carried out at temperatures and for periods of time which are effective to degrade the copolymer, i.e., reduce the molecular weight of the copolymer to the desired molecular weights (i.e., $\overline{M}_n$ of from about 15,000 to about 150,000) and thickening efficiency. If catalysts are utilized, the amount of catalyst employed is a catalytic effective amount, i.e., an amount effective to catalyze the degradation process.

One such mechanical degradation process comprises the shear assisted oxidation or mechanical breakdown and oxidation of the copolymers in the presence of an oxygen-containing gas such as air in a mechanical mixer such as an extruder, masticator, Banbury mixer, rubber mill, or the like. The mechanical breakdown and oxidation of the copolymer may be done with a single piece of equipment, or may be done in stages with increasing intensity of the degree of breakdown which takes place and the amount of oxygen incorporated in the polymer. It is preferred to operate in the absence of solvent or fluxing oil so the polymer is readily exposed to air. Useful equipment includes Banbury mixers and mills having adjustable gaps, which devices may be enclosed in jacketed containers through which a heating medium may be passed such as superatmospheric stream or heated DOWTHERM ®. When mastication or breakdown has reached a desired level, as determined by oxygen uptake and reduction in thickening efficiency (T.E.) as defined below, a fluxing oil may be added to the degraded polymer. Usually enough oil is added to provide a concentration of degraded polymer in the range of about 5 weight percent to 50 weight percent based on the weight of the total resulting solution. Useful temperatures for oxidatively degrading the polymers are in the range of about 25° to 750° F. The time required to achieve satisfactory results will depend on the type of degrading or mastication equipment, the temperature of degrading, and particularly the speed of rotation if using a blade mixer as the degrading or masticating device. For example, the Bramley Beken Blade Mixer can be used in providing a single piece of equipment, the desired degree of mastication, or milling and oxidative degradation. This mixer, which is equipped with a variable speed drive, has two rollers, fitted with helically disposed knives geared so that one roller revolves at one-half the speed of the other. The rollers are journalled in a jacketed reactor having two hemispherical halves in its base, which conform to the radii of the two rollers. Superheated steam, or heated DOWTHERM", may be circulated through the jacket to provide the desired temperature.

Additionally, various catalysts and/or accelerators can be employed to accelerate the degradation of the copolymer. The catalysts include metals or metal salts or complexes such as copper, vanadium, chromium, manganese, nickel, iron, cobalt, molybdenum and their salts and complexes such as oleates, naphthenates, octoates, carboxylates, stearates and other long chain, oil soluble, organic acid salts. Other catalysts and/or cocatalysts include the peroxides such as dibenzoyl peroxide, diocyl peroxides, and dialkyl peroxides. Other suitable peroxide catalysts are disclosed in U.S. Pat. No. 3,313,793, incorporated herein by reference. One type of a catalytic, oxidative, shear accelerated process is disclosed in U.S. application Ser. No. 241,620, filed Sep. 8, 1988, incorporated herein by reference.

The period of time that is generally required to achieve the desired reduction in molecular weight and thickening efficiency will vary depending upon the temperature, RPM and horsepower of the mixer, catalyst (if any), and the amount of catalyst and accelerator used. However, a time period of about 2 minutes to about 12 hours is generally adequate depending upon the degree to which it is desired to reduce the T.E. and molecular weight.

Another method for the mechanical degradation or shearing of the etheylene-α-olefin copolymer comprises oxidizing the copolymer in a closed vessel equipped with shearing blades. A typical apparatus of this type is a device containing counter-rotating helical blades and known as a "Barbender Torque Rhoeometer". Typically, means are provided for supplying air, oxygen, or another oxygen-containing gas to the shearing cavity of the vessel. Alternatively, or additionally, the oxygen source may be a nongaseous material such as a peroxide, placed in the reaction chamber with the copolymer; this may also have a beneficial effect on the reaction rate. It is preferred, however, that a gaseous source of oxygen be used. Although normally an outside source of gaseous oxygen is provided, this is not absolutely necessary. When the usual outside source is used, however, the gas may be supplied to the shearing cavity at any convenient flow rate. Normally, air or oxygen is provided at a rate sufficient to exchange all the air or oxygen in the shearing cavity every few seconds. Means are also provided for maintaining the shearing cavity at an elevated temperature, usually in the range of about 170°-230° C. preferably 180°-225° C.

These mechanical degradation or shearing processes may also be carried out under an inert gas or atmosphere such as nitrogen, i.e., in the substantial absence of oxygen.

One such shear assisted degradation carried out under an inert atmosphere may be carried out in a masticator, a rubber mill, a Banbury mixer, Brabender mixers, and other mechanical mixing devices which can mix or knead the ethylene-α-olefin copolymer, rubber at elevated temperatures with the other components of the reaction into a homogeneous solid rubbery mass so degradation can take place in the solid state. Combinations of equipment may also be used, such as a low temperature mixer for premixing the ingredients, following which they can be transferred to a high temperature heated mixer for degradation.

The degradation is preferably carried out using free radical initiators such as peroxides, and preferably those which have a boiling point greater than about 100° C. Representative of these free-radical initiators are dilauroyl peroxide, 2,5-di-methyl-hex-3-yne-2, 5-bis-tertiary-butyl peroxide (sold as Lupersol 130) or its hexane analogue, di-tertiary butyl peroxide and dicumyl peroxide. The presence of an acid, e.g. maleic anhydride, with the peroxide is preferred as it catalyzes the decomposition of the peroxide to activate the peroxide. Other activators of the peroxide, other than acid, can be used such as the hydroperoxides disclosed by European Published Patent Application 0123424, including cumene hydroperoxide, hydrogen peroxide, tertiary butyl hydroperoxide, etc. The initiator is generally used at a level of between about 0.005% and about 1%, e.g. 0.05 to 0.5%, based on the total weight of the olefin polymer, and temperatures of about 120° to 250° C.

The initiator degradation is preferably carried out at 120°-50° C., more preferably 150°-220° C. An inert atmosphere, such as that obtained by nitrogen blanketing is used. The total time for degradation and/or grafting will usually range from about 0.005 to 12 hours. If carried out in an extruder, the total time will be relatively short, e.g. 0.005 to 0.2 hours. In a masticator usually from about 0.5 to 6 hours, more preferably 0.5 to 3 hours total time will be required. The degradation reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

Degradation can take place separately by heating and mixing with the initiator, preferably under shearing stress.

Another molecular weight degradation process involves thermal degradation of the copolymer in the absence of oxygen. One such thermal degradation process involves heating the ethylene-α-olefin copolymer in the presence of catalytic amount of catalyst, preferably from 0.075% to 10%, in the absence of oxygen to a temperature of from 275° to 450° C. or higher, particularly when using superatmospheric pressure conditions, preferably to a temperature of from 300° to 400° C. for a period which will vary depending upon the temperature, catalyst and the amount of catalyst used, which time period is adequate to produce the desired reduction in molecular weight. Employing catalysts in amounts and at temperatures within the upper portion of the above-mentioned respective ranges, the time of heating can be as little as five minutes; using an amount of catalyst in the lower portion at the lower temperatures, within the aforesaid range of 0.075% to 10%, the time of heating can be from four to five hours.

The catalysts are generally those which are known in the art for thermal degradation processes and include: (i) an oxide or (ii) carbonate of an alkali metal, alkaline earth metal, or a heavy metal, namely, antimony, bismuth, cadmium, chromium, copper, iron lead, mercury, tantalum, titanium, thallium, vanadium and zinc; metal salts of aminocarboxylic, dicarboxylic or tricarboxylic aliphatic, phenyl or naphtyl carboxylic acid such as those disclosed in U.S. Pat. No. 3,332,926, incorporated herein by reference; and the like.

The heating of the polymer, catalyst mixture can be carried out in any suitable closed equipment such as a batch reactor or continuous reactor through which the mixture of polymer and catalyst is passed continuously for the necessary residence time to produce at the temperature of operation the desired lower molecular weight polyolefin. The heating can be carried out under vacuum, at ambient pressures r under superatmospheric pressure conditions. In the case of batch operations at ambient or superatmospheric pressure conditions, the heating can be carried out under a blanket of nitrogen or other oxygen-free atmosphere.

If desired, the mixture of catalyst and polymer can be stirred or agitated during the heating.

The thermal oxidative degradation process involves heating the ehtylene-α-olefin copolymer at a temperature of at least about 100° C. in the presence of oxygen or air so as to cause degradation of the copolymer. Such degradation is usually characterized by a substantial reduction of the molecular weight of the copolymer.

A particularly useful method of preparing the oxidized and degraded copolymer involves heating a fluid solution of copolymer in an inert solvent and bubbling oxygen or air through the solution at a temperature of at least 100° C. until the desired degradation is achieved. In lieu of oxygen or air, any mixture of oxygen and inert gas such as nitrogen or carbon dioxide may be used. The inert gas thus functions as a carrier of oxygen and often provides a convenient means of introducing oxygen into the reaction mixture.

The inert solvent useful in preparing the fluid solution of the copolymer reactant is preferably a liquid inert hydrocarbon such as naphtha, hexene, cyclohexene, dodecane, biphenyl, xylene or toluene. It may be a polar solvent such as diphenyl oxide. The amount of the solvent to be used is not critical so long as a sufficient amount is used to result in the fluid solution of the interpolymer. Such solution usually contains from about 60 to 95% of a solvent.

The temperature at which the copolymer is oxidized and degraded is at least about 100° C., preferably at least about 150° C. and it may be as high as 250° C. or even higher.

The copolymers of the instant invention may also be degraded to lower molecular weight by homogenization. The homogenization process is conventional and known in the art. In the homogenization process the copolymer, generally in a liquid state such as for example in a solution of copolymer dissolved in a solvent such as those described above, is forced at high pressure through a device which utilizes variously designed throttle valves and narrow orifices. Such a device can generate very high shear rates. Commercial devices such as that from the Manton-Gaulin Manufacturing Company or modifications thereof may be employed. Such equipment may be operated at pressures of up to about 20,000 psi to generate the necessary shear stress. The homogenization process may be employed in batch or continuous mode, depending on the degree of degradation desired.

The degraded ethylene-α-olefin copolymers preferably ethylene-propylene copolymers, have number average molecular weights of from about 15,000 to about 300,000, preferably from about 20,000 to about 200,000, more preferably from about 20,000 to about 150,000.

The degraded ethylene-α-olefin copolymers of the instant invention are useful as viscosity index improvers for oleaginous compositions. Accordingly, a minor amount, e.g., from about 0.0011 to about 49 wt. %, based on the weight of the total composition, of the oil-soluble degraded ethylene copolymers produced in accordance with this invention can be incorporated into a major amount of an oleaginous material, such as a lubricating oil or hydrocarbon fuel, depending upon whether one is forming finished products or additive concentrates. The amount of the viscosity index improving or modifying degraded ethylene-α-olefin copolymers of the present invention present in an oleaginous composition such as a lubricating oil composition, e.g., fully formulated lubricating oil composition, is an amount which is effective to improve or modify the viscosity index of said oil composition, i.e., a viscosity improving effective amount. Generally, this amount is from about 0.001 to about 20 wt. %, preferably from about 0.01 to about 15 wt. %, and more preferably from about 0.1 to about 10 wt. %, based on the weight of the total composition.

The lubricating oils to which the products of this invention can be added include not only hydrocarbon oil derived from petroleum, but also include synthetic lubricating oils such as esters of dibasic acids; complex esters made by esterification of monobasic acids, polyglycols, dibasic acids and alcohols; polyolefin oils, etc.

The degraded copolymers of the invention may be utilized in a concentrate form, e.g., from about 2 wt % up to about 49 wt. %, preferably 3 to 25 wt. %, in oil, e.g., mineral lubricating oil, for ease of handling, and may be prepared in this form by carrying out the reaction of the invention in oil as previously discussed.

The above oil compositions may optionally contain other conventional additives, such as for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ¼ to 15 hours, at a temperature in the range of about 66 to about 316. C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as nepthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70. and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydroacarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-

(hydorxyalkyl) alkenyl succinimides. The disclosures of the above reference are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weigh alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$-$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Disprsant | 0.1–20 | 0.1–8 |
| Pour Point Depresant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the viscosity index improver (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the viscosity index improver additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

As mentioned hereinbefore the degraded ethylene copolymers of the present invention are particularly useful as fuel and lubricating oil additives.

The degraded ethylene coplymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins polybutenes, alkyl benzenes, organic esters of phosphoric acids, polysilicone oils, etc.

The degraded ethylene copolymers of the instant invention are oil-soluble, dissolvable in oil with the aid of a suitable solvent, or are stably dispersible therein. Oil-soluble, dissolvable, or stably dispersible as that terminology is used herein does not necessarily indicate that the materials are soluble, dissolvable, miscible, or capable of being suspended in oil in all proportions. It does mean, however, that the additives for instance, are soluble or stably dispersible in oil to an extend sufficient to exert their intended effect in the environment in which the oil is employed. Moreover, the additional incorporation of other additives may also permit incorporation of higher levels of a particular copolymer hereof, if desired.

Accordingly, while any effective amount, i.e., viscosity index improving or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.001 to about 20, preferably 0.01 to 15, more preferably from 0.1 to about 10 and most preferably from about 0.25 to about 5 wt. %, based on the weight of said composition.

In another aspect of the present invention the degraded ethylene-α-olefin copolymers are grafted with grafting materials as described infra to form grafted degraded ethylene copolymers.

GRAFTING MATERIALS

The materials or compounds that are grafted on the degraded ethylene copolymer backbone to form the grafted degraded ethylene copolymers of the instant invention are those materials that can be grafted onto said degraded ethylene copolymers. These materials are generally well-known in the art as grafting materials for conventional olefin polymers, e.g., ethylene-alpha-olefin copolymers, and are generally commercially available or may be readily prepared by well-known conventional methods. The grafting materials preferably contain olefinic unsaturation and further preferably contain at least one of carboxylic acid moiety, anhydride moiety, hydroxyl moiety, sulfur atom, nitrogen atom, and oxygen atom. The olefinically unsaturated portion, i.e., ethylenically unsaturated portion, is one which is capable of reacting with the ethylene copolymer backbone and upon reaction therewith becomes saturated.

These materials include, for example, unsaturated mono- and polycarboxylic acids, preferably the $C_4$–$C_{10}$ acids, with preferably at least one olefinic unsaturation, and anhydrides, salts, esters, ethers, amides, nitriles, thiols, thioacids glycidyl, cyano, hydroxy, glycol and other substituted derivatives of said acids. Preferred carboxylic acid grafting materials are (i) the monounsaturated $C_4$ to $C_{10}$ dicarboxylic acids wherein (a) the carboxyl groups are vicinyl (i.e., located on adjacent carbon atoms), and (b) at least one, preferably both, of the adjacent carbon atoms are part of said mono unsaturation; or (ii) derivatives of (i) such as anhydrides or $C_1$ to $C_5$ alcohol derived mono- or diesters of (i). Upon reaction with the ethylene-alpha-olefin copolymer, the monounsaturation of the dicarboxylic acid, anhydride, or ester becomes saturated. Thus, for example, maleic anhydride becomes an ethylene-alpha-olefin substituted succinic anhydride.

Examples of such acids, anhydrides and derivatives thereof include maleic acid, fumaric acid, himic acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, himic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e., styrene, chlorostyrenes, bromostyrenes, -methyl styrene, vinyl pyridines and the like.

Other monomers which can be used are $C_4$ to $C_{50}$ vinyl esters, vinyl esters and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

A large proportion of the materials falling in this class will be polymerizable monomers, but not all. Some will be materials which are reactive with the base polymer, but do not form polymers, i.e., maleic anhydride.

Also, a large proportion of the materials falling in the class will have functionality in addition to unsaturation, but not necessarily so, i.e., styrene or ethylene.

A subgeneric definition that encompasses a class of suitable reactants is as follows:

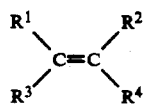

wherein:
(a) when $R^1=R^2=R^3=R^4$ is H or halogen, preferably F and Cl;
(b) when $R^1$ and $R^2$ are H, $R^3$ is H, halogen, or $C_1$–$C_{10}$ alkyl and $R_4$ is halogen —$COOR^5$,

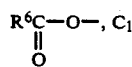

to $C_{50}$, preferably $C_1$ to $C_{30}$ and most preferably $C_1$ to $C_{10}$ alkyl, aryl, alkaryl, and substituted derivatives thereof,

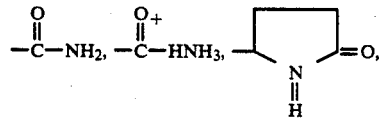

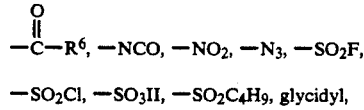

—$SO_2Cl$, —$SO_3H$, —$SO_2C_4H_9$, glycidyl,

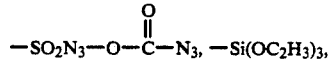

—$SO$—$C_2H_3$, $SO_2C_2H_5$, wherein $R^5$=H or $R^6$ and $R^6$ is a $C_1$ to $C_{30}$ hydrocarbon group and M is a metal of any valance; and c) $R^1$ and $R^3$ are H and $R^2$ and $R^4$ are connected into a strained ring compound having 4 to 50 carbon atoms such as himic acids.

Since post-treating processes involving the use of these post-treating reagents are known insofar as application to conventional grafted ethylene copolymers of the prior art, detailed descriptions of these processes herein are unnecessary. In order to apply the prior art processes to the compositions of this invention, all that is necessary is that reaction conditions, ratio of reactants, and the like as described in the prior art, be applied to the novel compositions of this invention. The following is copolymerizable therewith;

(8) methacrylates and acrylates, both monomeric and polymeric; and (9) oxygen- or sulfur-containing vinyl heterocyclic compounds.

Some specific non-limiting illustrations of compounds of group (1) include esters of unsaturated alcohols such as allyl, methallyl, crotyl, 1-chloroallyl, chloroallyl, cinnamyl, vinyl, methylvinyl, 1-phenallyl, and butenyl with (a) saturated acids such as acetic, propionic, butyric, valeric, capric, and stearic; (b) unsaturated acids such as acrylic, alpha-substituted acrylic (including alkylacrylic, e.g., methacrylic, ethylacrylic, propylacrylic, and arylacrylic such as phenylacrylic), crotonic, oleic, linoleic, and linolenic; (c) polybasic acids such as oxalic, malonic, succinic, glutaric, adipic, pimelic, suberic, azelaic, and sebacic; (d) unsaturated polybasic acids such as maleic, fumaric, citracenic, mesaconic, itaconic, methylenemalonic, acetylenedicarboxylic, and conicic; and (e) aromatic acids such as benzoic, phenylacetic, phthalic, terephthalic and benzolphthalic. Illustrative of the group (1)(a) esters are vinyl acetate and the vinyl esters of an acid of the formula

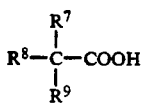

wherein $R^7$–$R^9$ are independently selected from saturated alkyl groups, said acid containing about 10 carbon atoms. These esters are disclosed in U.S. Pat. Nos. 3,687,849 and 3,551,336, both of which are incorporated herein by reference.

Some specific non-limiting illustrations of compounds of group (2) include esters of saturated alcohols such as methyl, ethyl, propyl, isopropyl, butyl, iso-butyl, sec-butyl, tert-butyl, 2-ethylhexyl, cyclohexyl, bekenyl, ethylene glycol, diethanolamino-ethanol, ethanolamine, and diethylene glycol with unsaturated aliphatic monobasic and unsaturated polybasic acids, examples of which are illustrated in (1)(b) and (1)(d) above. The preferred unsaturated polybasic acids are the alpha, beta-unsaturated dibasic acids yielding esters such as ethyl fumarate, octyl fumarate and lauryl maleate. These esters are described in U.S. Pat. Nos. 3,687,849 and 3,551,336, both of which are incorporated herein by reference.

Some illustrative non-limiting examples of compounds of group (3) include methyl vinyl ether, ethyl vinyl ether, cyclohexyl vinyl ether, octyl vinyl ether, diallyl vinyl ether, ethyl methallyl ether and allyl ethyl ether. These ethers are preferably olefinically unsaturated aliphatic or cycloaliphatic ethers containing up to about 20 carbon atoms. Such ethers are described in U.S. Pat. No. 3,687,849, incorporated herein by reference.

Some illustrative non-limiting examples of the unsaturated ketones of group (4) include methyl vinyl ketone, ethyl vinyl ketone, propyl vinyl ketone, and pentyl vinyl ketone. These ketones are preferably olefinically unsaturated aliphatic ketones containing up to about 20 carbon atoms. Such ketones are described in U.S. Pat. No. 3,687,849, incorporated herein by reference.

The olefinically unsaturated, polar, nitrogen-containing compounds, i.e., enophiles, of group (5) are well known in the art and are described, inter alia, in U.S. Pat. Nos. 3,089,832, 4,092,255, 4,146,489, 4,194,984 and 4,051,050 and United Kingdom Patent Nos. 1,601,079, 1,558,991 and 1,578,667, all of which are incorporated herein by reference. These compounds may be acyclic or heterocyclic. If they are heterocyclic, they will generally have the ethylenically unsaturated moiety, e.g., vinyl, attached to a ring atom of the heterocyclic ring such as the nitrogen atom or a carbon atom. The principal requirement of the nitrogen-containing compounds are the presence of a nitrogen atom and an unsaturated portion, i.e., ethylenic unsaturation, capable of reacting with the ethylene copolymer backbone. Thus, in its broadest form, the ethylenically unsaturated nitrogen-containing reactant may be selected from a broad group of tetra-substituted olefins. Thus, the reactant can be represented by the general formula:

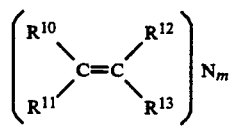

wherein $R^{10}$, $R^{11}$, $R^{12}$, and $R^{13}$ may be the same or different at least one being an electron-attracting group, N represents a nitrogen moiety and m ranges from 1 to 50. Thus, the only restriction placed upon said groups is that the final reactant contains at least one nitrogen atom. In this manner, the ethylenically unsaturated nitrogen-containing reactant may be represented by the above general formula where $R^{10}$, $R^{11}$, $R^{12}$, and $R^{13}$ are independently selected from the groups consisting of hydrogen and $C_1$ to $C_{30}$ straight and branched chain alkyl, arylalkyl, cycloalkyl, alkenyl, arylalkenyl and cycloalkenyl moieties and/or one or more reactive groups of the class consisting of alkyl unsaturation, cyano, carboxyl, epoxide, thiol, carbonyl, isocyanate, thionyl, amido, hydroxy, imino, acylhalide, halo, lactamo, lactono, dicarboxylic acid anhydride, thiolic anhydride, thionic anhydride, dithionic anhydride, disubstituted amino, trisubstituted amino, ureido, isourea and dicarboxylamic acid anhydride or one-half of cyclic dicarboxylic acid anhydrides as in maleic anhydride or one-half of cyclic thionic anhydride or one-half of cyclic dithionic anhydride or one-half of cyclic dicarboxylic amic acid anhydride or one-half of cyclic N $C_{1-18}$ hydrocarbyl imides such as N-dodecylmaleimide and pyrrolidine.

The term "$N_m$", as used in the above formula, is intended to indicate that the nitrogen-containing group or moiety is present in one or more of the "R" groups, and/or several nitrogen-containing groups may be present in the same "R" group; however, there must be at least one N-containing moiety in the reactant with a preferred range of m of 1 to 10, more preferably 1 to 5. Thus, in acrylonitrile, $R^{10}$, $R^{11}$ and $R^{12}$ are hydrogen atoms while X=1; that is, $R^{13}$ is a "CN" group. Examples of these groups include alpha-chloroacrylonitrile, N,N-dibutyl acrylamide, acrylamide, N-t-octyl acrylamide; thioacrylamide, N-n-octylacrylamide, vinylidene cyanide, N-acryloyl-morpholine, N,N-dimethylamino ethyl methacrylate, t-dodecylaminoethyl acrylate, N-octyl maleimide, N-vinyl-5-methyl-2-pyrrolidone, pyrrolidinyloctyl vinyl sulfide, N-vinylethyleneurea, N-vinyl-1,2-propyleneurea, N-vinylcarbazole, butanamido-decyl vinyl ether, acetamidooctadecyl vinyl ether, ureidoethyl vinyl ether, 2-vinyl-5-methylpyridine, and tetracyanoethylene.

Included within this group are compounds represented by the formula

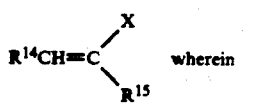

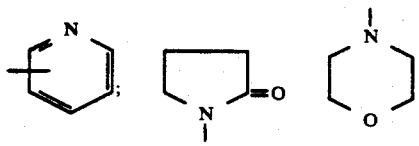

or a
polynuclear aromatic amino group;
$R^{14}$ is either hydrogen or a $C_1$ to $C_4$ alkyl group;
$Y = O$ or $NR^{19}$;
$R^{15}$, $R^{17}$, $R^{18}$ and $R^{13}$ are independently selected from hydrogen and alkyl groups, preferably $C_1$–$C_{20}$ alkyl groups; and
$R^{16}$ is a methylene or polymethylene having up to 16 carbon atoms.

Some illustrative non-limiting examples of the polar, olefinically unsaturated nitrogen containing compounds include N-vinyl pyrrolidone, vinylpyridines, C-vinyl-pyridines such as 2-vinylpyridine, 4-vinylpyridine, and lower alkyl ($C_1$–$C_8$) substituted C-vinyl-pyridines such as 2-methyl-5-vinylpyridine, 2-methyl-4-vinylpyridine, 2-vinyl-5-ethyl pyridine and 2-vinyl-6-methylpyridine. Other polar nitrogen compounds include, but are not limited to, dimethyl-aminoethyl methacrylate or acrylate, vinylimidazole, N-vinylcarboazole, N-vinylsuccinimide, acrylonitrile, o-, m-, or p-aminostyrene, maleimide, N-vinyl oxazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxabutyl] acrylamide, N-[1,2-dimethyl-1ethyl-3-oxobutyl] acrylamide, N-(1,3-diphenyl-1-methyl-3-oxopropyl)acrylamide, N-(1-methyl-1-phenyl-3-oxobutyl) methacrylamide, N,N-diethylaminoethyl acrylamide, and 2-hydroxyethyl acrylamide; a variety of N-vinylcaprolactams or their thio-analogs, such as N-vinylthiopyrrolidone, 3-methyl-1-vinylpyrrolidone, 4-methyl-4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone,4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminipropyl acrylamide and methacrylamide, N-methacryloxyethylpyrrolidone, N-methacryloxyethylmorpholine, N-methacryloxyethylmorpholine, N-maleimide of dimethylaminopropylamine, and the N-methacrylamide of aminoethylethyleneurea; a variety of vinylimidazoles or vinyl imidazolines such as N-vinylimidazole, N-vinyl methyl-2-imidazole, N-vinyl ethyl-2-imidazole, N-vinylbenzimidazole, N-vinyl methyl-2-imidazoline, N-vinyl phenyl-2-imidazoline and vinyl-2-imidazole.

Also included within the enophiles are the unsaturated nitriles having the formula:

wherein $R^{14}$ is a hydrogen or a lower alkyl, e.g., methyl, ethyl, and the like, T is a hydrogen atom, a halogen atom, a cyano or a lower alkyl group, e.g., methyl, ethyl, propyl, butyl and the like. Non-limiting examples of nitrile monomers include acrylonitrile, methacylonitrile, alpha-bromoacrylonitrile, alpha-chloroacrylonitrile, vinylidine cyanide and allyl cyanide.

The ethylenically unsaturated carboxylic acid materials of group (6) are generally (i) ethylenically monounsaturated $C_4$ to $C_{10}$ dicarboxylic acids wherein (a) the carboxyl groups are vicinyl, i.e., located on adjacent carbon atoms, and (b) at least one, preferably both, of said adjacent carbon atoms are part of said mono unsaturation; or (ii) derivatives of (i) such as anhydrides or $C_1$ to $C_5$ alcohol derived mono- or diesters of (i). Upon reaction with the ethylene copolymer, the monounsaturation of the dicarboxylic acid, anhydride or ester becomes saturated. Thus, for example, maleic anhydride becomes hydrocarbyl substituted succinic anhydride.

Also included within this category are the ethylenically monounsaturated monocarboxylic acid materials. The monocarboxylic acid materials include (1) monounsaturated $C_3$ to $C_{10}$ monocarboxylic acid wherein the carbon-carbon bond is conjugated to the carboxy group, i.e., of the structure.

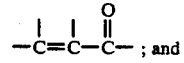; and (2) derivatives of (1) such as $C_1$ to $C_5$ alcohol derived monoesters of (1). Upon reaction with the ethylene copolymer, the monounsaturation of the monounsaturated carboxylic acid material becomes saturated. Thus, for example, acrylic acid becomes an ethylene copolymer substituted propionic acid, and methacrylic acid becomes an ethylene copolymer substituted isobutyric acid.

Exemplary of such unsaturated mono- and dicarboxylic acids, or anhydrides thereof include fumaric acid, itaconic acid, maleic acid, maleic anhydride, chloromaleic anhydride, acrylic acid, methacrylic acid, crotonic acid, cinnamic acid, methyl acrylate, ethyl acrylate, methyl methacrylate, etc.

Preferred carboxylic acid materials are the dicarboxylic acid anhydrides. Maleic anhydride or a derivative thereof is particularly preferred as it does not appear to homopolymerize appreciably but grafts onto the ethylene copolymer to give two carboxylic acid functionalities. Such preferred materials have the generic formula

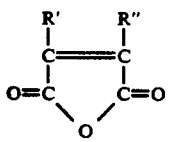

wherein R' and R" are independently hydrogen or a halogen.

These group 6 materials are particularly preferred as the grafting materials in the present invention.

The group (7) grafting materials are a system comprising (a) unsaturated polycarboxylic acids or anhydrides which can be grafted, preferably by free radical addition, onto the polymeric backbone, and (b) one or more other monomers different from (a) copolymerizable therewith. Representative of such unsaturated polycarboxylic acids or anhydrides are maleic acid, fumaric acid, citraconic acid, mesaconic acid, itaconic acid, methylenemalonic acid, acetylenedicarboxylic acid, aconitic acid, the anhydrides of any of the foregoing acids, and similar acids and anhydrides containing about 4 to 12 carbon atoms. Maleic acid or maleic anhydride is preferred. Mixtures of any of the acids or anhydrides may be used.

The monomers (b) copolymerizable with the unsaturated mono- or dicarboxylic acids or anhydrides, preferably maleic acid or anhydride are any alpha, beta-monoethylenically unsaturated monomers which are sufficiently soluble in the reaction medium and reactive towards said unsaturated polycarboxylic acid or anhydrides so that substantially higher amounts of said acid or anhydride can be incorporated into the grafted polymeric product that is obtainable using said acid or anhydride alone. Suitable monomers include the esters, amides, and nitriles or acrylic and methacrylic acid, and other monomers containing no free acid groups. Representative of these classes are the methyl, ethyl, propyl, butyl, pentyl, hexyl, cyclohexyl, 2-ethylhexyl, and isodecyl esters of acrylic or methacrylic acid. Other useful monomers are styrene, alpha-methyl styrene, $C_1$-$C_4$ alkyl and alkoxy ring substituted styrenes such as p-methyl styrene, p-sec. butyl styrene, p-methoxy styrene, and $C_4$-$C_{17}$ alpha olefins such as isobutylene, and the like. Other types of monomers are the vinyl esters such as vinyl acetate, propionate and butyrate; vinyl ketones such as methyl and ethyl vinyl ketone; and other vinyl and vinylidene monomers such as vinyl chloride and vinylidene chloride. Any mixtures of two or more of the comonomers may be used. Comonomers containing more than one polymerizable double bond and/or functional groups which may induce crosslinking or gelation, such as hydroxyl, primary and secondary amino groups, should be avoided. Conjugated diolefins, such as butadiene, may be used in minor amounts since such monomers have less tendency to crosslink than do the non-conjugated diolefins. Although the monomers may contain up to about 40 carbon atoms, those containing up to about 10 carbon atoms are preferred. The higher carbon content monomers add weight and cost but confer no appreciable advantage in terms of ease of polymerization with said acid or anhydride (a).

Extensive studies have been made of the reactivity of maleic anhydride with other monomers, including reactivity ratios which will enable the polymer chemist to easily select the monomers and monomer proportions for optimizing the incorporation of maleic anhydride into the graft copolymers of the invention, ranging from the ideal of monomers which alternate with maleic anhydride in each of the grafts to monomers which form blocks of random chains with maleic anhydride in each of the grafts. Such studies include Flory, Principles of Polymer Chemistry, Cornell University Press, 1953, pps. 178-199, especially Tables XX and XXII, and Brandrup and Immergut, Polymer Handbook, 2nd Ed., 1975, John Wiley & Sons, Inc., pages II-105, II-227 to 229.

The monomer ratios will depend on the reactivity of the monomers selected, more comonomers being required when a monomer is chosen which has a greater tendency to homopolymerize than to copolymerize with said acid or anhydride such as maleic acid or anhydride. Generally, the ratio will be in the range of about 1:4 to about 4:1, of acid or anhydride such as maleic acid or anhydride to comonomer, preferably about 1:2 to 2:1. Sufficient acid or anhydride such as maleic acid or anhydride should be present in the monomer system to provide about 1-10% by weight of acid or anhydride such as maleic acid or anhydride in the graft copolymer product, based on the weight of the product, preferably about 2-6% by weight.

Such grafting materials of group (7) are described in U.S. Pat. Nos. 4,160,739 and 4,161,452 incorporated herein by reference.

Included within the scope of the methacrylates and acrylates of group (8) are the monomeric and polymeric methacylates and acylates. The monomeric methacrylates and acrylates include the esters represented by the formula

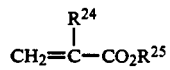

wherein:

$R^{24}$ is hydrogen or alkyl, preferably of from 1 to 3 inclusive carbon atoms, as exemplified by methyl, ethyl and propyl; and $R^{25}$ is alkyl of from 1 to 30 inclusive carbon atoms exemplified by methyl, ethyl, propyl, butyl, pentyl, hexyl, isopropyl, neopentyl, isobutyl, tertiarybutyl, hexadecyl, octadecyl, eicosyl, docosyl, pentacosyl and isomers and mixtures thereof. Also included within the scope of the monomeric methacrylates and acrylates are acrylic acid and methacrylic acid.

The polymeric methacrylates and acrylates i.e., polymethacrylates and polyacrylates, are polymers comprised of one or more of these monomers.

The methacrylate monomers and polymers are described, for example in U.S. Pat. Nos. 3,089,832 and 4,811,031, both of which are incorporated herein by reference.

Also falling within the scope of the methacrylates are the polymethacrylates comprised of monomer members selected from dialkylaminoalkylmethacrylates, mixtures thereof with the aforedescribed alkyl methacrylates, and mixtures of the aforedescribed alkyl methacrylates. Such polymethacrylates based on dialkylaminoalkylmethacrylates, mixtures thereof with alkyl methacrylates, and mixtures of ethyl methacrylates are described in U.S. Pat. No. 3,879,304, incorporated herein by reference.

The dialkylaminoalkylmethacrylate monomers are represented by the general formula

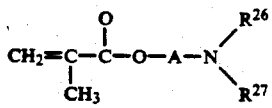

where $R^{26}$ and $R^{27}$ are independently alkyl of 1 to 2 carbon atoms and A is alkadiyl of from 2 to 4 carbons. Some examples of these dialkylaminoalkylmethacrylates are N,N-dimethylaminoethyl methacrylate, N,N-diethylaminoethyl methacrylate, N,N-dimethylaminopropyl methacrylate and N,N-diethyolaminopropyl methacrylate.

The oxygen or sulfur containing heterocyclic compounds of group (9) are disclosed in U.S. Pat. No. 3,687,849, incorporated herein by reference. Some illustrative non-limiting examples of these compounds are vinylfuran, vinylbenzofuran, N-vinylthiopyrrolidone, and N-vinyloxazolidone.

Groups (2)–(9) of grafting materials are not mutually exclusive but may, in some instances, overlap. Thus, for example, some of the compounds falling in group (8) are also encompassed by group (5), e.g., acrylonitriles and acrylamides.

In the practice of the instant invention only one ethylenically unsaturated grafting material may be used or a mixture of two or more different grafting materials may be utilized.

GRAFTING OF THE DEGRADED ETHYLENE COPOLYMER

Grafting of the degraded ethylene copolymer with the grafting materials may be accomplished by conventional and well-known grafting processes. These well-known and conventional processes include thermal grafting by the "ene" reaction, using copolymers containing unsaturation, either chlorinated or unchlorinated, or preferably by free-radical induced grafting in solvent, preferably in a mineral lubricating oil as solvent.

The free radical grafting is preferably carried out using free radical initiators such as peroxides, hydroperoxides, and azo compounds and preferably those which have a boiling point greater than about 100° C. and which decompose thermally within the grafting temperature range to provide said free radicals. The initiator is generally used at a level of between about 0.005% and about 1%, based on the total weight of the polymer solution, and temperatures of about 125° to 250° C., preferably from about 150° C. to about 220° C. are used.

The grafting material such as ethylenically unsaturated carboxylic acid material, e.g., maleic anhydride, is generally used in an amount ranging from about 0.01% to about 10%, preferably 0.01 to 2.0%, based on weight of the initial total solution. The aforesaid grafting material such as carboxylic acid material and free radical initiator are generally used in a weight percent ratio range of 1.0:1 to 30:1, preferably 3.0:1 to 6:1.

In the practice of the instant invention when these grafting materials are grafted onto the aforedescribed degraded ethylene copolymer the resultant grafted copolymer contains the degraded ethylene copolymer as the backbone and the residue of the ethylenically unsaturated grafting material as the grafted moiety. By residues is meant the respective moieties produced by and remaining after the grafting process or reaction. Thus, for example, while the ethylenically unsaturated grafting material may be maleic anhydride, after the grafting reaction it is the succinic anhydride moiety that is grafted or attached to the ethylene copolymer backbone. Thus, this succinic anhydride moiety is referred to herein as the residue of the ethylenically unsaturated grafting material, i.e., residue of maleic anhydride.

A preferred method of grafting is by free-radical induced grafting in solvent, preferably in a mineral lubricating oil as solvent. The free-radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are asobutyro-nitrile, 2,5-di-methyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g., with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said grafting material such as unsaturated carboxylic acid material and initiator are added with agitation, although they could have been added prior to heating. When the reaction is complete, the excess grafting material can be eliminated by an inert gas purge, e.g. nitrogen sparging. Preferably the grafting material such as carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer mineral lubricating oil solution. Continuous or periodic addition of the grafting material such as carboxylic acid material along with an appropriate portion of initiator, during the course of the reaction, can be utilized to maintain the grafting material such as carboxylic acid material below its solubility limits, while still obtaining the desired degree of total grafting.

In the initiator grafting step the grafting material such as maleic anhydride used will be grafted onto both the polymer and the solvent for the reaction. Many solvents such as dichlorobenzene are relative inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the polyamine or polyol and as a solvent for the end product to form the lubricating additive concentrate.

The solution grafting step when carried out in the presence of a high temperature decomposable peroxide can be accomplished without substantial further degradation of the chain length (molecular weight) of the degraded ethylene containing polymer. This can be an advantage as opposed to high temperature thermal reactions which depend on degradation to apparently form free radical reactive sites. Measurement of molecular weights and degradation can be evaluated by determination of the thickening efficiency (T.E.) of the polymer as will later be described, and by GPC.

The amount of grafting material used in the grafting reaction is an amount which is effective to provide a grafted degraded ethylene-alpha-olefin copolymer exhibiting the properties of a multifunctional viscosity index improver, that is, a material having VI improving properties in an oleaginous composition and also having at least one additional property such as dispersancy, antioxidancy, etc. In the aspect of the instant invention wherein the grafted degraded ethylene-alpha-olefin copolymer, preferably degraded ethylene-alpha-olefin copolymer grafted with the monounsaturated carboxylic acid material of group 6, is further reacted with the polyamine containing at least two reactive amino groups, the amount of grafting material used in the grafting reaction is an amount which upon further reaction of said grafted ethylene copolymer with said polyamine provides a material exhibiting the properties of a viscosity index improver-dispersant additive. Generally, this amount of grafting material, e.g., moles of carboxylic acid material such as maleic anhydride, is an amount which is effective to provide a grafted degraded ethylene copolymer, e.g., ethylene-alpha-olefin substituted carboxylic acid material such as ethylene-propylene substituted succinic anhydride, containing an average number of acid material moieties, e.g., succinic anhydride, grafted to or present on a 10,000 number average molecular weight segment of a mole of ethylene copolymer of at least about 0.1, preferably at least about 0.5, and more preferably at least about 1. The maximum average number of grafted moieties present per 10,000 average number molecular weight segment of a mole of ethylene copolymer backbone should not exceed about 10, preferably about 7 and more preferably about 5. Preferably, the average number, moles, of grafted moieties present per mole of ethylene copolymer backbone is at least about 0.6, preferably at least about 0.8, and more preferably at least about 1. Preferably, the maximum average number of grafted moieties grafted to or present per mole of degraded ethylene copolymer backbone should generally not exceed about 10, preferably about 7, and more preferably about 5. Thus, for example, a mole of grafted degraded ethylene copolymer, e.g., degraded ethylene-propylene substituted succinic anhydride, containing a degraded ethylene copolymer backbone such as a degraded ethylene-propylene backbone having an average number molecular weight of 50,000 contains grafted to said backbone an average number of succinic anhydride moieties of from about 0.5 to about 50, preferably from about 0.6 to about 10. Typically, from about 0.2 to about 12, preferably from about 0.4 to about 6 moles of said carboxylic acid material are charged to the reactor per mole of ethylene copolymer charged.

Normally, not all of the degraded ethylene copolymer reacts with the grafting material, e.g., maleic anhydride, to produce a grafted degraded ethylene copolymer, e.g., degraded ethylene-propylene substituted succinic anhydride. The resultant reaction product mixture, therefore, contains reacted or grafted ethylene copolymer, e.g., ethylene-propylene substituted succinic anhydride, unreacted or ungrafted ethylene copolymer, and unreacted grafting material, e.g., maleic anhydride. The unreacted ethylene copolymer is typically not removed from the reaction product mixture, and the reaction product mixture, generally stripped of any unreacted grafting material, is utilized as is or is employed for further reaction with the amine as described hereinafter.

Characterization of the average number of moles of grafting material such as carboxylic acid material, e.g., maleic anhydride, which have reacted per mole of ethylene copolymer charged to the reaction (whether it has undergone reaction or not) is defined herein as the average number of grafted moieties grafted to or present per mole of ethylene copolymer while the amount of unreacted ethylene copolymer present in the resulting reaction product mixture can be subsequently modified, i.e., increased or decreased by techniques known in the art, such modifications do not alter the average number of grafted moieties as defined above. The term grafted degraded ethylene copolymer is intended to refer to the reaction product mixture whether it has undergone such modification or not.

These grafted degraded ethylene-α-olefin copolymers are useful as a viscosity index improver and/or multifunctional viscosity index improver for oleaginous compositions, particularly lubricating oil compositions.

The amount of said grafted degraded ethylene-α-olefin copolymer utilized in oleaginous compositions such as lubricating oil compositions is an amount which is effective to improve the viscometric properties, particularly viscosity index, of said compositions, i.e., a viscosity index improving effective amount. Generally, this amount is from about 0.001 to about 20 wt. %, preferably from about 0.01 to about 15, and more preferably from about 0.1 to about 10 wt. %, based on the weight of the total composition.

The oleaginous compositions containing said viscosity index improving effective amounts of said grafted degraded ethylene copolymer may also optionally contain the types and amounts of other additives as described hereinafore, e.g., antioxidants, pour point depressants, other viscosity index improvers, dispersants, corrosion inhibitors, etc.

Furthermore, these grafted degraded ethylene copolymers may be formulated into oil concentrates, which oil concentrates may then be added to the oleaginous compositions such as lubricating oil compositions. Typically such oil concentrates contain from 2 to about 49 wt. %, preferably from about 3 to about 25 wt. %, of said grafted degraded ethylene copolymers in oil, e.g., mineral lubricating oil.

In yet another aspect of the instant invention, the grafted, preferably acid material of group 6, grafted degraded ethylene copolymers are reacted with a polyamine or polyol to form nitrogen or ester containing grafted degraded ethylene copolymers useful as multifunctional viscosity index improvers, i.e., viscosity index improvers-dispersants, in oleaginous compositions.

THE POLYAMINE

The polyamines which are reacted with the grafted, preferably acid material grafted, degraded ethylene copolymers have two or more, i.e., at least two, reactive amino groups selected from primary amino groups, secondary amino groups and mixtures thereof, preferably primary amino groups. Such polyamines are well know in the art and are described inter alia in U.S. Pat. Nos. 4,234,435; 3,804,763 and 3,948,800, all of which are incorporated herein by reference.

Preferred polyamines includes the aliphatic saturated amines, including those of the general formulae:

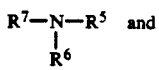 (I)

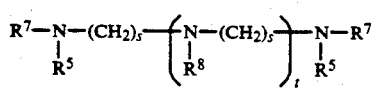 (Ia)

wherein $R^7$, $R^5$, $R^6$, and $R^8$ are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and wherein $R^6$ and $R^8$ can additionally comprise a moiety of the formula

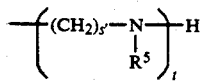 (Ib)

wherein $R^5$ is as defined above, and wherein each s and s' can be the same or a different number of from 2 to 6, preferably 2 to 4; and t and t' can be the same of different and are each numbers of typically from 0 to 10, preferably about 2 to 7, most preferably about 3 to 7, with the proviso that $t+t'$ is not greater than 10. To assure a facile reaction it is preferred that $R^7$, $R^5$, $R^6$, $R^8$, (s), (s'), (t) and (t') be selected in a manner sufficient to provide the compounds of formula Ia with typically at least two primary amino groups. This can be achieved by selecting at least one of said $R^7$, $R^6$, or $R^8$ groups to be hydrogen or by letting (t) in formula Ia be at least one when $R^8$ is H or when the (Ib) moiety possesses a primary amino group.

Non-limiting examples of suitable polyamine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-1, 3-diaminopropane; N,N-di-(2-aminoethyl) ethylene diamine; N,N-di(2-hydroxyethyl)-1,3-propylene diamine; N-dodecyl-1,3-propane diamine; and mixtures thereof.

Other useful amine compounds include; alicyclic diamines such as 1,4-di(aminoethyl) cyclohexane, and N-aninoalkyl piperazines of the general formula:

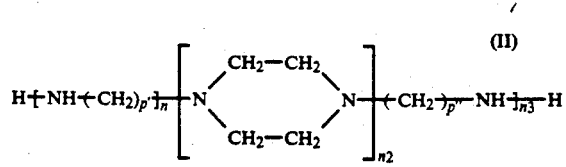 (II)

wherein p' and p" are the same or different and are each integers of from 1 to 4, and $n_1$, $n_2$ and $n_3$ are the same or different and are each integers of from 1 to 3.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly(ethyleneamine) compounds averaging about 5 to 7 nitrogen atoms per molecule are available commercially under trade names such as "Polyamine H", "Polyamine 400", "Dow Polyamine E100", etc.

Useful amines also include polyoxyalkylene polyamines such as those of the formulae:

 (III)

where m has a value of about 3 to 70 and preferably 10 to 35; and

 (IV)

where n has a value of about 1 to 40, with the provision that the sum of all the n's is from about 3 to about 70, and preferably from about 6 to about 35, and $R^9$ is a substituted saturated hydrocarbon radical of up to 10 carbon atoms, wherein the number of substituents on the $R^9$ group is from 3 to 6, and "a" is a number from 3 to 6 which represents the number of substituents on $R^9$. The alkylene groups in either formula (III) or (IV) may be straight or branched chains containing about 2 to 7, and preferably about 2 to 4 carbon atoms.

Particularly preferred polyamine compounds are the polyoxyalkylene polyamines of Formulae III and IV, and the alkylene polyamines represented by the formula

 (V)

wherein x is an integer of about 1 to 10, preferably about 2 to 7, and the alkylene radical is a straight or branched chain alkylene radical having 2 to 7, preferably about 2 to 4 carbon atoms.

Examples of the alkylene polyamines of formula (V) include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkylsubstituted piperazines, etc. These amines include, for example, ethylene diamine, diethylene triamine, triethylene tetramine, propylene diamine, di(-heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3-bis-(2-aminopropyl)imidazoline, pyrimidine, 1-(2-aminopropyl)piperazine, 1,4-bis(2-aminoethyl)piperazine, N,N'-dimethyaminopropyl amine, N,N'-dioctylethyl amine, N-octyl-N'-methylethylene diamine, 2-methyl-1-(2-aminobutyl)piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950), incorporated herein by reference. These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formulae III and IV, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and the polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Included within the scope of the term polyamines are the hydroxyalkyl polyamines, particularly the hydroxyalkyl alkylene polyamines, having one or more hydroxyalkyl substituents on the nitrogen atoms. Preferred hydroxyalkyl-substituted alkylene polyamines are those in which the hydroxyalkyl group is a lower hydroxyalkyl group, i.e., having less than eight carbon atoms. Examples of such hydroxyalkyl-substituted polyamines include N-(2-hydroxyethyl)ethylene diamine, N,N-bis(2-hydroxyethyl)ethylene diamine, 1-(2-hydroxyethyl)piperazine, monohydroxy-propyl-substituted diethylene triamine, dihydroxypropyl-substituted tetraethylene pentamine, N-(3-hydroxybutyl)tetramethylene diamine, etc. Higher homologs as are obtained by condensation of the above-illustrated hydroxy alkylene polyamines through amino radicals or through hydroxy radicals are like wise useful. Condensation through amino radicals results in a higher amine accompanied by removal of ammonia and condensation through the hydroxy radicals results in products containing ether linkages accompanied by removal of water.

In another aspect of the instant invention the grafted, preferably acid material grafted, degraded ethylene copolymer may be reacted with a polyol to form an ester containing grafted degraded ethylene copolymer instead of with the polyamine to form a nitrogen containing grafted degraded ethylene copolymer.

THE POLYOL

The polyols which are reacted with the grafted, preferably acid material grafted, degraded ethylene copolymers are well known in the art and are described, inter alia, in U.S. Pat. No. 4,234,435, incorporated herein by reference. Suitable polyol compounds which can be used include aliphatic polyhydric alcohols containing up to about 100 carbon atoms and about 2 to about 10 hydroxyl groups. These alcohols can be quite diverse in structure and chemical composition, for example, they can be substituted or unsubstituted, hindered or unhindered, branched chain or straight chain, etc. as desired. Typical alcohols are alkylene glycols such as ethylene glycol, propylene glycol, trimethylene glycol, butylene glycol, and polyglycols such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexanediol, pinacol, tetrahydroxy pentane, erythritol, arabitol, sorbitol, mannitol, 1,2-cyclohexane, 1,4-dihydroxy-2-nitrobutane, 1,4-di-(2-hydroxyethyl)-benzene, and the carbohydrates such as glucose, mannose, glyceraldehyde, galactose, and the like.

A preferred class of aliphatic alcohols are those containing up to 20 carbon atoms, and especially those containing three to 15 carbon atoms. This class of alcohols includes glycerol, etythritol, pentaerythritol, dipentaerythritol, tripentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6,-tetrakis(hydroxymethyl)-cyclohexanol, 1,10-decanediol, and the like.

An especially preferred class of polyhydric alcohols are the polyhydric alkanols containing three to 15, especially three to six carbon atoms and having at least three hydroxyl groups. Such alkanols are exemplified in the above specifically identified alcohols and are represented by glycerol, erythritol, pentaerythritol, mannitol, sorbitol, 1,2,4-hexanetriol, and tetrahydroxy pentane and the like.

In another aspect of the instant invention the grafted degraded ethylene copolymer instead of being reacted with only the polyamine or polyol is reacted in a reaction mixture containing (i) a carboxylic acid component and said polyamine or polyol, or (ii) the preformed reaction products, e.g., salts, imides, esters, amides, etc., of a carboxylic acid component and the polyamine or polyol. Thus, for example a reaction mixture containing the grafted degraded ethylene copolymer, e.g., degraded ethylene-propylene substituted succinic anhydride, and carboxylic acid component, e.g., polyisobutenyl substituted succinic anhydride, is prepared by admixing these two reactants, and the polyamide is then introduced into this reaction mixture and the reaction is carried out as described hereinafter. Alternatively, the carboxylic acid component and polyamine may be added substantially simultaneously to a reaction mixture containing the grafted degraded ethylene copolymer.

CARBOXYLIC ACID COMPONENT

The carboxylic acid component includes: hydrocarbyl substituted dicarboxylic acid or anhydride, preferably succinic anhydride or acid, having 12 to 49 carbons, preferably 16 to 49 carbons in said hydrocarbyl group; long chain monocarboxylic acid of the formula $R^{10}COOH$ where $R^{10}$ is a hydrocarbyl group of 50 to 400 carbons; and long chain hydrocarbyl substituted dicarboxylic acid or anhydride, preferably succinic anhydride or acid, having from about 50 to about 400 carbons in said hydrocarbyl group. The preferred carboxylic acid component is the long chain hydrocarbyl substituted dicarboxylic acid or anhydride, preferably succinic acid or anhydride, having from about 50 to about 400 carbon atoms in said hydrocarbyl group. Said hydrocarbyl groups are essentially aliphatic and include alkenyl and alkyl groups. The longer chain acids and anhydrides are preferred, particularly when the grafting reaction is carried out in lubricating oil.

The about $C_{50}$–$C_{400}$ hydrocarbyl subtituted dicarboxylic acid or anhydride includes the reaction product of the $C_{50}$–$C_{400}$ hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; or with (ii) derivatives of (i) such as anhydrides of (i). Upon reaction with the hydrocarbon polymer, the monounsaturation of the dicarboxylic acid, anhydride, etc. becomes saturated. Thus for example, maleic anhydride becomes a hydrocarbyl substituted succinic anhydride.

Typically, from about 0.7 to about 4.0 (e.g., 0.8 to 2.6), preferably from about 1.0 to about 2.0, and most preferably from about 1.1 to about 1.7 moles of said unsaturated $C_4$ to $C_{10}$ dicarboxylic acid, anhydride or ester are charged to the reactor per mole of polyolefin charged.

Normally, not all of the polyolefin reacts with the unsaturated acid or derivative and the hydrocarbyl substituted dicarboxylic acid material will contain unreacted polyolefin. The unreacted polyolefin is typically not removed from the reaction mixture (because such removal is difficult and would be commercially infeasible) and the product mixture, stripped of any unreacted monounsaturated $C_4$ to $C_{10}$ dicarboxylic acid or anhydride, is employed as the carboxylic acid component.

Characterization of the average number of moles of dicarboxylic acid or anhydride, which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polyolefin contained in the resulting product mixture can be subsequently modified, i.e., increased or decreased by techniques known in the art, such modifications do not alter functionality as defined above. The term $C_{50}$–$C_{400}$ hydrocarbyl substituted dicarboxylic acid material is intended to refer to the product mixture whether it has undergone such modification or not.

Accordingly, the functionality of the $C_{50}$–$C_{400}$ hydrocarbyl substituted dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such unsaturated dicarboxylic acids or anhydrides thereof are fumaric acid, itaconic acid, maleic acid, maleic anhydride, chloromaleic acid, chloromaleic anhydride, etc.

Preferred about $C_{50}$ to about $C_{400}$ olefin polymers for reaction with the unsaturated dicarboxylic acids or derivatives thereof are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used will usually have number average molecular weights within the range of about 700 and about 5,600, more usually between about 800 and about 3000. Particularly useful olefin polymers have number average molecular weights within the range of about 900 and about 2500 with approximately one terminal double bond per polymer chain. An especially useful starting material is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D> D. Bly, "Modern Size Exclusion Liquid Chromatography", John Wiley and Sons, New York, 1979.

Processes for reacting the about $C_{50}$ to about $C_{400}$ olefin polymer with the $C_{4-10}$ unsaturated dicarboxylic acid or anhydride are known in the art. For example, the olefin polymer and the dicarboxylic acid or derivative may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C., for about 0.5 to 10, preferably 1 to 7 hours. The halogenated polymer may then be reacted with sufficient unsaturated acid or derivative at 100° to 250° C., usually about 180° to 235° C., for about 0.5 to 10, e.g. 3 to 8 hours, so the product obtained will contain the desired number of moles of the unsaturated acid or derivative per mole of the halogenated polymer. Processes of this general type are taught in U.S. Pat. Nos. 3,087,936; 3,172,892; 3,272,746 and others.

Alternatively, the olefin polymer, and the unsaturated acid or derivative are mixed and heated while adding chlorine to the hot material. Processes of this type are disclosed in U.S. Pat. Nos. 3,215,707; 3,231,587; 3,912,764; 4,110,349; and in U.K. 1,550,219.

By the use of halogen, about 65 to 95 wt. % of the polyolefin, e.g. polyisobutylene will normally reacted with the dicarboxylic acid or derivative. Upon carrying out a thermal reaction without the use of halogen or a catalyst, then usually only about 50 to 75 wt. % of the polyisobutylene will react. Chlorination helps increased the reactivity.

Particularly preferred as the acid component is polyisobutenyl succinic anhydride.

PREREACTED AMINE OR POLYOL-CARBOXYLIC ACID COMPONENT

The aforementioned polyamine or polyol and carboxylic acid component may be prereacted, with the acid being generally attached to the polyamine or polyol through salt, imide, amide, amidine, ester or other linkages so that a primary amino group of the polyamine or a hydroxyl group of the polyol is still available for reaction with the acid or anhydride moieties of the grafted ethylene copolymer. A convenient source of these preacted materials are the well-known and generally commercially available lubricating oil dispersants, provided they retain primary amino groups or hydroxyl groups capable of further reaction with the grafted copolymer.

Usually these dispersants are made by condensing a hydrocarbyl substituted dicarboxylic acid or anhydride, preferably one having about 50 to 400 carbons in the hydrocarbyl substituent, such as these described hereinafore under "Carboxylic Acid Component", preferably a succinic acid producing material such as alkenyl succinic anhydride, with a polyamine or polyol, including those described above under "Polyamines" or "Polyols."

Monocarboxylic acid dispersants have been described in U.K. Patent Specification 983,040. There, polyamines are reacted with the high molecular weight mono carboxylic acid derived from a polyolefin, such as polyisobutylene, by oxidation with nitric acid or oxygen; or by addition of halogen to the polyolefin followed by hydrolyzing and oxidation; etc. Another method is taught in Belgian Patent 658,236, incorporated herein by reference where polyolefin, such as the polymers of $C_2$ to $C_5$ monoolefins, e.g., polypropylene or polyisobutylene, is halogenated, e.g., chlorinated, and then condensed with an alpha, beta-unsaturated, monocarboxylic acid of from 3 to 8, preferably 3 to 4, carbon atoms, e.g., acrylic acid, alpha-methyl-acrylic acid, i.e., 2-methyl propenoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc., is well known in the art, as seen in U.S. Pat. No. 3,272,746, incorporated herein by reference.

Most preferred are the lubricating oil dispersants made by reaction of the aforesaid alkylene polyamines previously described, with $C_{50}$–$C_{400}$ alkenyl succinic anhydrides described hereinafore.

Reaction, preferably amination and/or imidation of the carboxylic acid material is usefully done as a solution reaction with the acid material, usually polyisobutenyl-succinic anhydride, dissolved in a solvent such as mineral oil, to which the other reactant is added. The formation of the dispersants in high yield can be effected by adding from about 0.5 to 3.3, preferably about 0.7 to 1.3, most preferably about 1 to 1 molar proportions of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final acyl nitrogen compound solution.

REACTION OF GRAFTED DEGRADED ETHYLENE COPOLYMER WITH POLYAMINE OR POLYOL

The grafted degraded ethylene copolymer, preferably in solution generally equal to about 5 to 30 wt. %, preferably 10 to 20 wt. % polymer, can be readily reacted with a polyamine; mixture of polyamine and carboxylic acid component; pre-reacted polyamine and carboxylic acid component; polyol; a mixture of polyol and carboxylic acid component; or with pre-reacted polyol and carboxylic acid component, by admixture and heating at a temperature of from about 100° C. to 250° C., preferably from 150° to 200° C., for from about 0.1 to 10 hours, usually about 0.2 to about 6 hours. In the case of polyamines the heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water, e.g., by $N_2$ stripping during slow addition of amine with stirring, assures completion of the imidation reaction. Reaction ratios can vary considerably, depending upon the reactants, amounts of excess, type of bonds formed, etc. Generally, the amount of polyamine used is an amount which is effective or sufficient to provide from about 0.5 to about 2.5, preferably from about 0.8 to about 1.2 and more preferably from about 0.9 to about 1.0 equivalents of reactive primary amine moiety per acid equivalent of the grafted acid moiety of the grafted ethylene copolymer, e.g., succinic anhydride. If a polyol is used in place of the polyamine generally the amount of polyol reactant used is an amount which is effective or sufficient to provide from about 0.5 to about 2.5, preferably from about 0.8 to about 1.2, and more preferably from about 0.9 to about 1.0 equivalents of reactive hydroxyl moiety per acid equivalent of the grafted acid moiety of the grafted degraded ethylene copolymer. The amount of carboxylic acid component used is generally from about 0.5 to about 4, preferably from about 1.0 to 3 mole equivalents per mole equivalent of the grafted acid moiety content, e.g., succinic anhydride content, of the grafted ethylene copolymer.

Alternately, if pre-reacted polyamine and carboxylic acid component is used, such as a dispersant, sufficient dispersant is used to provide from about 0.5 to about 2.5 preferably from about 0.8 to about 1.2, and more preferably from about 0.9 to about 1.0 equivalents of reactive primary amine moiety per acid equivalent of the grafted degraded acid moiety of the grafted degraded ethylene copolymer. Likewise, if pre-reacted polyol and carboxylic acid component is used, such as a dispersant, sufficient dispersant is used to provide from about 0.5 to about 2.5, preferably from about 0.8 to about 1.2, and more preferably from 0.9 to about 1.0 equivalents of reactive hydroxyl moiety per acid equivalent of the grafted dicarboxylic acid moiety of the grafted degraded ethylene copolymer.

Under certain conditions, particularly upon storage, oleaginous compositions, particularly oil concentrates, containing the multifunctional viscosity index improver additives of the instant invention may exhibit an increase in viscosity. This viscosity increase appears to be due, at least in part, to chain extension and/or crosslinking of the nitrogen or ester containing grafted degraded ethylene copolymer of the instant invention. In order to stabilize the viscosity and retard or inhibit said viscosity increase of these oil compositions the nitrogen or ester containing grafted degraded ethylene copolymers of the instant invention can be treated or post-reacted with a variety of materials, particularly acid materials, to inactivate a portion of the remaining reactive primary amino groups or hydroxyl groups. This treatment diminishes or retards chain-extension and/or crosslinking of the nitrogen or ester containing grafted ethylene copolymer adduct. Thus, for example, the adducts may be reacted or post-treated with $C_1$-$C_{30}$ monocarboxylic acids or anhydrides, preferably acetic anhydride, or unsubstituted or $C_1$ to $C_{28}$ hydrocarbyl substituted dicarboxylic acid anhydrides as disclosed in U.S. Pat. No. 4,137,185, incorporated herein by reference; the sulfonic acids of U.S. Pat. No. 4,144,181, incorporated herein by reference; and the $C_{12}$ to $C_{18}$ hydrocarbyl substituted dicarboxylic anhydrides, preferably $C_{12}$ to $C_{18}$ hydrocarbyl substituted succinic anhydride, of U.S. Pat. No. 4,803,003, incorporated herein by reference.

Preferred viscosity stabilizing materials are those disclosed in U.S. Pat. No. 4,803,003, i.e., the $C_{12}$ to about $C_{18}$ hydrocarbyl substituted dicarboxylic anhydrides. These anhydrides may be represented by the general formula $R^{11}X$ wherein $R^{11}$ is hydrocarbyl group containing a total of from 12 to about 18, preferably 12 to 16, more preferably 12 to 14, and most preferably 12 carbons, which are essentially aliphatic, saturated or unsaturated, and include alkenyl groups, alkyl groups, and mixtures of alkenyl groups and alkyl groups, preferably alkenyl groups, and can be straight chain or branched. When $R^{11}$ is an alkenyl group it is preferred that the olefinic unsaturation site be located near the anhydride, e.g., allylic to X, moiety. The radical X will usually contain 4 to 10, preferably 4 to 8, more preferably 4 to 6, and most preferably 4 carbon atoms and will define a dicarboxylic anhydride. The X radical may be represented by the formula

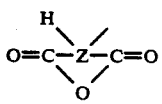

wherein Z is selected from alkylene and alkenylene radicals containing from 2 to 8, preferably 2 to 6, more preferably 2 to 4, and most preferably 2 carbon atoms. Preferably Z is an alkylene radical. The most preferred X radical is the succinic anhydride radical, i.e.,

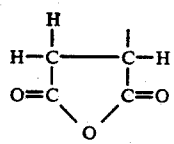

The X radical is linked to the $R^{11}$ group by a carbon to carbon linkage.

The amount of the hydrocarbyl substituted dicarboxylic acid anhydride component utilized is a viscosity stabilizing effective amount. By viscosity stabilizing effective amount is meant any amount which is effective to stabilize the viscosity of an oleaginous solution of the derivatized ethylene copolymers, i.e., inhibit or retard the increase in viscosity over an extended period of time of an oil solution, particularly an oil concentrate, of the nitrogen containing grafted ethylene copolymers. Generally this amount is from about 0.5-2.5, preferably 1-1.5 moles of $C_{12}$ to about $C_{18}$ hydrocarbyl substituted dicarboxylic acid anhydride per mole of unreacted reactive amino group, i.e., secondary and/or primary amino group, of the ethylene copolymer grafted with a carboxylic acid material and thereafter reacted with the polyamine.

The chain extension termination or end-capping of the nitrogen or ester containing grafted degraded ethylene copolymer which was preferentially prepared in a mineral oil solution can be conducted by subsequently introducing the $C_{12}$ to about $C_{18}$ hydrocarbyl substituted dicarboxylic acid anhydride directly into the reaction system used to prepare said nitrogen or ester containing grafted ethylene copolymer, or it can be a separate non-integrated reaction step. Generally, the nitrogen or ester containing grafted ethylene copolymer is first produced by preparing the grafted ethylene copolymer and then reacting this grafted copolymer with at least one polyamine or polyol, or with a mixture of carboxylic acid component and polyamine or polyol, or with the preformed carboxylic acid component and polyamine or polyol, and this nitrogen or ester containing grafted ethylene copolymer is then subsequently reacted or treated with the $C_{12}$ to about $C_{18}$ hydrocarbyl substituted dicarboxylic anhydride in an end-capping or chain extension limiting step. A viscosity stabilizing effective amount of the $C_{12}$ to about $C_{18}$ hydrocarbyl substituted dicarboxylic anhydride is introduced into the heated solution containing the nitrogen or ester containing grafted ethylene copolymer and the reaction carried on for a period of about 0.25 to 8 hours at a temperature of about 100° to 200° C. being preferred. In order to fully complete the reaction, it is generally useful to utilize a slight excess, i.e., about 1 to 30, more usually about 1 to 10, percent by weight of the $C_{12}$ to about $C_{18}$ hydrocarbyl substituted dicarboxylic anhydride. The entire reaction is generally carried out under an inert atmosphere, for example, a nitrogen blanket.

This reaction can be conducted in a polar or nonpolar solvent, e.g., xylene, toluene, benzene, and the like, and is preferably conducted in the presence of a mineral or synthetic lubricating oil.

Alternatively, at least a portion of the $C_{12}$ to $C_{18}$ hydrocarbyl substituted dicarboxylic anhydride or other end-capping agent can be introduced into a reaction mixture containing a grafted copolymer prior to or concurrently with the introduction of the polyamine or polyol reactant, and the remaining portion of the end-capping agent can be reacted with the preformed, partially end-capped nitrogen or ester containing grafted ethylene copolymer.

The grafted degraded ethylene copolymers and/or the nitrogen or ester containing grafted degraded ethylene copolymers, i.e., the derivatized degraded ethylene copolymers of the instant invention, either unreacted or reacted with the viscosity stabilizing or end-capping agents described hereinafore, may optionally be post-treated by contacting said copolymers with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols. The same post-treating reagents are used with derivatized ethylene copolymers prepared from a combination of polyamines and polyols. However, when the derivatized ethylene copolymers are derived from polyols, that is when they are esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, epoxides, and episulfides.

Since post-treating processes involving the use of these post-treating reagents are known insofar as application to reaction products of high molecular weight carboxylic acid acylating agents of the prior disclosures and amines and/or alcohols, detailed descriptions of these processes herein is unnecessary. In order to apply the prior disclosure processes to the compositions of this invention, all that is necessary is that reaction conditions, ratio of reactants, and the like as described in the prior disclosures, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012 (use of acidified clays in post-treating carboxylic derivative compositions derived from the acrylating reagents of this invention and amines); 3,639,242; 3,708;522; 3,859,318; 3,865,813; 3,470;098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743. The processes of these incorporated patents, as applied to the compositions of this invention, and the post-treated compositions thus produced constitute a further aspect of this invention.

As mentioned supra, the nitrogen or ester containing grafted degraded ethylene copolymers of the instant invention are useful as multifunctional viscosity index improver additives, particularly viscosity index improvers-dispersant additives, for oleaginous compositions such as lubricating oil compositions.

Thus, base oil suitable for use in preparing the lubricating compositions of the present invention include those conventionally employed as crankcase lubricating oils for spark-ignited and compression-ignited internal combustion engines, such as automobile and truck engines, marine and railroad diesel engines, and the like.

Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The nitrogen or ester containing grafted degraded ethylene copolymers of the instant invention are oil-soluble, dissolvable in oil with the aid of a suitable solvent, or are stably dispersible therein. The terms oil-soluble, dissolvable in oil, or stably dispersible in oil as that terminology is used herein does not necessarily indicate that the materials are soluble, dissolvable, miscible, or capable of being suspended in oil in all proportions. It does mean, however, that the additives for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving—dispersant effective amount, of the additives of the present invention can be incorporated into the fully formulated lubricating oil composition, it is contemplated that such effective amount be sufficient to provide said lube oil composition with an amount of the additive of typically from about 0.001 to about 20, preferably about 0.01 to about 15, more preferably from about 0.1 to about 10, and most preferably from about 0.25 to about 5.0 wt. %, based on the weight of said composition.

The lubricating oil compositions may also contain other conventional and well-known lube oil additives of the types and in amounts described hereinafore.

Furthermore, the nitrogen or ester containing grafted degraded ethylene copolymers may be formulated into oil concentrate compositions, which concentrate may then be added to oil compositions. Typically, such oil concentrates contain from about 2 to about 49 wt. %, preferably from about 3 to about 25 wt. % of said nitrogen or ester containing grafted degraded ethylene copolymers in oil, e.g., mineral lubricating oil, based on the total weight of the concentrate composition.

The following examples further illustrate the present invention. The examples are presented by way of illustration and do not limit the invention thereto. Unless otherwise indicated, all parts and percentages are on a weight basis.

COMPARATIVE EXAMPLE 1

An ethylene-propylene copolymer having an ethylene content of about 56%, an $\overline{M}_w$ of about 180,000, an $\overline{M}_n$ of about 112,500, a $\overline{M}_w/\overline{M}_n$ of about 1.6, a $\overline{M}_z/\overline{M}_w$ of about 1.2, a Shear Stability Index (SSI) of about 50%, and a Thickening Efficiency (T.E.) of about 3.52 is prepared in a tubular reactor under the following conditions:

| | |
|---|---|
| Reactor Inlet Temp. (°F.) | 33 |
| Reactor Outlet Temp. (°F.) | 128 |
| Sidestream Feed Temp. (°F.) | 26 |
| Catalyst Premix Temp. (°F.) | 37 |
| Reactor Residence Time (Sec.) at Sidestream 1/2/3/4/5/6 | 0.3/0.56/1.0/1.11/1.22/1.34 |
| Inlet Feed Rates (Klb./hr.) | |
| Hexane | 177 |
| Ethylene | 1.06 |
| Propylene | 18.2 |
| VCl$_4$ | 0.042 |
| Al$_2$(C$_2$H$_5$)$_3$Cl$_3$ | 1.09 |
| Sweep Hexane | 9.9 |
| Sidestream Feed Rates (Klb./hr.) | |
| Hexane | 88 |
| Ethylene | 8.8 |
| Propylene | 14 |
| Total Hexane (Klb./hr.) | 275 |
| Sidestream Feed Splits (wt. %) | |
| Sidestream 1/2/3/4/5/6 | 7.7/7.7/32.4/14.4/16.9/20.7 |

A portion of this undegraded copolymer is tested to determine its properties as a V.I. improver additive. The portion of the undegraded 3.52 T.E. copolymer utilized for testing is dissolved in S150 NRP mineral oil to form a mineral oil solution. The amount of said copolymer dissolved in the mineral oil is an amount effective to provide a mineral oil solution having a Kinematic Viscosity (KV) at 100° C. of 13.0 centistokes. This mineral oil solution also contains 0.4 wt. % of fumarate vinyl acetate copolymer pour point depressant. The CCS (Cold Cranking Simulator), MRV (Mini Rotary Viscometer) and TP-1 of this mineral oil solution are determined, and the results are set forth in Table I as "Comparative Example 12".

MRV (Mini Rotary Viscometer), is determined using a technique described in ASTM-D3829, and measures viscosity in centipoise. MRV was determined at −25° C.

CCS (Cold Cranking Simulator), is determined using a technique described in SAE J300 Appendix, and is a high shear viscosity measurement in centipoise. This test is related to a lubricating oil's resistance to cold engine starting. The higher the CCS the greater the oil's resistance to cold engine starting.

TP-1 is determined using a technique described in ASTM-D4684. This is essentially the same as the MRV noted above except that a slow cooling cycle is used. The cycle is defined in SAE Paper No. 850443, K. O. Henderson et al. MRV, CCS and TP-1 are all indicative of the low temperature viscometric properties of oil compositions.

Shear Stability Index (SSI) measures the mechanical stability of polymers used as V.I. improvers in crankcase lubricants subjected to high strain rates. The diesel fuel injector test was used (ASTM D3945, equivalent to DIN 51382). To determine SSI, the polymer under test is dissolved in a suitable base oil (for example, a solvent extracted 150 neutral) to a relative viscosity of 2 to 3 at 100° C. The oil solution is then circulated through a diesel fuel injector, for a total of thirty passes. The SSI is calculated from the initial 100° C. kinematic viscosity ($V_i$), the final kinematic viscosity ($V_f$), and the base oil viscosity ($V_b$), as SSI (%) = 100 × ($V_i$ − $V_f$)/($V_i$ − $V_b$). A reference sample (as required by the DIN method) is used to calibrate the test. The SSI is indicative of the resistance of a polymer to molecular weight degradation by shearing forces. The higher the SSI the less stable the polymer, i.e., the more susceptible it is to molecular weight distribution.

Thickening Efficiency (T.E.), as used herein, is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to $\overline{M}_w$ or $\overline{M}_v$ and is a convenient, useful measurement for formulation of lubricating oils of various grades.

EXAMPLES 2-6

The remaining portion of the copolymer of COMPARATIVE EXAMPLE 1 is degraded in molecular weight. This degradation comprises shearing the copolymer in a Brabender mixer, under an air atmosphere at elevated temperatures.

Five different degraded copolymers are prepared by shearing the copolymer of Comparative Example 1 with the temperature and residence time in the mixer for each degraded copolymer being set forth in Table 1. These degraded copolymers are identified as Examples 2-6 in Table 1. The T.E. and SSI of these degraded copolymers are determined and the results are set forth in Table 1. Furthermore, mineral oil solutions of these degraded copolymers are prepared to determine the effectiveness of these degraded copolymers as viscosity index improver additives. These mineral oil solutions are prepared by dissolving in S150NRP mineral oil an amount of degraded copolymer sufficient to provide a mineral oil solution having a KV at 100° C. of 13.0 centistokes. These mineral oil solutions also contain 0.4 wt. % of fumarate vinyl acetate copolymer pour point depressant. The CCS, MRV and TP-1 of these mineral oil solutions are determined and the results set forth in Table 1 as "Examples 2-6" respectively.

COMPARATIVE EXAMPLE 7

This example illustrates a lubricating oil composition falling outside the scope of the instant invention in that it contains a conventional non-narrow MWD ethylene-propylene copolymer falling outside the scope of the instant invention. This conventional ethylene-propylene copolymer has a $\overline{M}_n$ of about 80,000, a $\overline{M}_w$ of about 153,000, a $\overline{M}_w/\overline{M}_n$ of about 1.91, a $\overline{M}_z/\overline{M}_w$ of about 1.88, an ethylene content of about 44%, a T.E. of about 2.88, and a SSI of about 50%. A mineral oil solution of this ethylene-propylene copolymer is prepared by dissolving in S150 NRP mineral oil in an amount of this undegrade copolymer sufficient to provide a mineral oil solution having a KV at 100° C. of 13.0 centistokes. This oil solution also contains 0.4 wt. % of fumarate vinyl acetate copolymer pour point depressant. The CCS, MRV and TP-1 of this mineral oil solution are determined and the results are set forth in Table 1 as "Comparative Example 7".

TABLE 1

| | T.E. | SSI (%) | KV at 100° C. (cSt) | CCS at −20° C. (cP) | MRV at −25° C. (cP) | TP-1 at 25° C. (cP) | Shearing Time (Minutes) | Shearing Temperature (°C.) |
|---|---|---|---|---|---|---|---|---|
| Comparative Example 1 | 3.52 | 50 | 13.0 | 2550 | 9,910 | 9,000 | — | — |
| Example 2 | 3.27 | 52 | 13.0 | 2600 | 16,000 | 9,950 | 120 | 110 |
| Example 3 | 2.86 | 34 | 13.0 | 2600 | — | 11,000 | 65 | 140 |
| Example 4 | 2.58 | 27 | 13.0 | 2500 | 11,800 | 11,000 | 90 | 140 |
| Example 5 | 1.41 | 12 | 13.0 | 2960 | 23,300 | 14,100 | 110 | 140 |
| Example 6 | 1.04 | 4 | 13.0 | 3020 | 29,600 | 23,400 | 90 | 150 |
| Comparative Example 7 | 2.8 | 50 | 13.0 | 3100 | 18,000 | 20,000 | — | — |

COMPARATIVE EXAMPLE 8

An ethylene-propylene copolymer having an ethylene content of about 56%, an $\overline{M}_w$ of about 134,000, an $\overline{M}_n$ of about 82,000, a $\overline{M}_w/\overline{M}_n$ of about 1.63, a $\overline{M}_z/\overline{M}_w$ of about 1.21, a Shear Stability Index (SSI) of 26%, and a Thickening Efficiency (T.E.) of about 2.61 is prepared in a tubular reactor under the following conditions:

| | |
|---|---|
| Reactor Inlet Temp. (°F.) | 33 |
| Reactor Outlet Temp. (°F.) | 99 |
| Sidestream Feed Temp. (°F.) | 23 |
| Catalyst Premix Temp. (°F.) | 48 |
| Reactor Residence Time (Sec.) at Sidestream 1/2/3/4/5 | 0.56/1.0/1.1/1.22/1.34 |
| Inlet Feed Rates (Klb./hr.) | |
| Hexane | 139 |
| Ethylene | 0.49 |
| Propylene | 5.57 |
| VCl$_4$ | 0.039 |
| Al$_2$(C$_2$H$_5$)$_3$Cl$_3$ | 1.26 |
| Sweep Hexane | 6.5 |
| Sidestream Feed Rates (Klb./hr.) | |
| Hexane | 61 |
| Ethylene | 4.1 |
| Propylene | 7.1 |
| Total Hexane (Klb./hr.) | 206 |
| Sidestream Feed Splits (wt. %) | |
| Sidestream 1/2/3/4/5 | 10.9/31.2/15/17.7/24.7 |

A portion of this undegraded copolymer is tested to determine its properties as a V.I. improver additive. The portion of the undegraded 2.61 T.E. copolymer utilized for testing is dissolved in S150 NRP mineral oil to form a mineral oil solution. The amount of said copolymer dissolved in the mineral oil is an amount effective to provide a mineral oil solution having a Kinematic Viscosity (KV) at 100° C. of 13.0 centistokes. This mineral oil solution also contains 0.4 wt. % of fumarate vinyl acetate copolymer pour point depressant. The CCS (Cold Cranking Simulator), MRV (Mini Rotary Viscometer) and TP-1 of this mineral oil solution are determined, and the results are set forth in Table 2 as "Comparative Example 8".

EXAMPLES 9-11

The remaining portion, about 500 grams, of the copolymer of COMPARATIVE EXAMPLE 8 is degraded in molecular weight. This degradation comprises shearing the copolymer in a Brabender mixer, under an air atmosphere at elevated temperatures.

Three different degraded copolymers are prepared by shearing the copolymer of Comparative Example 8 with the temperature and residence time in the mixer for each degraded copolymer being set forth in Table 2. These degraded copolymers are identified as Examples 9-11 in Table 2. The T.E. and SSI of these degraded copolymers are determined and the results are set forth in Table 2 as "Examples 9-11" respectively. Furthermore, mineral oil solutions of these degraded copolymers are prepared to determine the effectiveness of these degraded copolymers as viscosity index improver additives. These mineral oil solutions are prepared by dissolving in S150NRP mineral oil an amount of degraded copolymer sufficient to provide a mineral oil solution having a KV at 100° C. of 13.0 centistokes. All of these mineral oil solutions also contain 0.4 wt. % of fumarate vinyl acetate copolymer pour point depressant. The CCS, MRV and TP-1 of these mineral oil solutions are determined and the results set forth in Table 2.

TABLE 2

| | T.E. | SSI (%) | KV at 100° C. (cSt) | CCS at −20° C. (cP) | MRV at −25° C. (cP) | TP-1 at 25° C. (cP) | Shearing Time (Minutes) | Shearing Temperature (°C.) |
|---|---|---|---|---|---|---|---|---|
| Comparative Example 8 | 2.61 | 26 | 13.0 | 2560 | 12,300 | 10,700 | — | — |
| Example 9 | 2.52 | 29 | 13.0 | 2500 | 13,500 | 11,900 | 30 | 140 |
| Example 10 | 1.81 | 16 | 13.0 | 2700 | 20,100 | 10,500 | 75 | 140 |
| Example 11 | 1.70 | 12 | 13.0 | 2740 | 23,000 | 13,200 | 30 | 150 |

COMPARATIVE EXAMPLE 12

An ethylene-propylene copolymer having an ethylene content of about 56%, an $\overline{M}_w$ of about 180,000, an $\overline{M}_n$ of about 112,000, a $\overline{M}_w/\overline{M}_n$ of about 1.6, a $\overline{M}_z/\overline{M}_w$ of about 1.25, a Shear Stability Index (SSI) of about 50%, and a Thickening Efficiency (T.E.) of about 3.45 is prepared in a tubular reactor under the following conditions:

| | |
|---|---|
| Reactor Inlet Temp. (°F.) | 33 |
| Reactor Outlet Temp. (°F.) | 128 |
| Sidestream Feed Temp. (°F.) | 26 |
| Catalyst Premix Temp. (°F.) | 37 |
| Reactor Residence Time (Sec.) at Sidestream 1/2/3/4/5/6 | 0.3/0.56/1.0/1.11/1.22/1.34 |
| Inlet Feed Rates (Klb./hr.) | |
| Hexane | 177 |
| Ethylene | 1.06 |
| Propylene | 18.2 |
| VCl$_4$ | 0.042 |
| Al$_2$(C$_2$H$_5$)$_3$Cl$_3$ | 1.09 |

-continued

| | |
|---|---|
| Sweep Hexane | 9.9 |
| Sidestream Feed Rates (Klb./hr.) | |
| Hexane | 88 |
| Ethylene | 8.8 |
| Propylene | 14 |
| Total Hexane (Klb./hr.) | 275 |
| Sidestream Feed Splits (wt. %) | |
| Sidestream 1/2/3/4/5/6 | 7.7/7.7/32.4/14.4/16.9/20.7 |

A portion of this ethylene-propylene copolymer is tested to determine its efficacy as a viscosity index improver additive. A lubricating oil composition of SAE 10W40 viscosity grade containing 0.63 wt. % of this degraded ethylenepropylene copolymer, 11.20 wt. % standard detergent inhibitor package, and 0.21 wt. % fumarate vinyl acetate copolymer pour point depressant is prepared. The KV (Kinematic Viscosity) at 100° C., in centistokes, CCS, MRV and TP-1 of this oil composition are determined and the results are set forth in Table 3.

EXAMPLE 13

The remaining portion of, about 500 grams, the undegraded copolymer of COMPARATIVE EXAMPLE 12 is degraded in molecular weight of a T.E. of about 2.0 by masticating in a laboratory masticator under an air atmosphere at 150° C. for three and three quarter hours.

The SSI of this degraded copolymer is determined to be about 25%. A lubricating oil composition of 10W40 quality containing 1.07 wt. % of the degraded ethylene-propylene copolymer, 11.20 wt. % of the same detergent inhibitor package as in COMPARATIVE EXAMPLE 12, and 0.21 wt. % of the same fumarate vinyl acetate copolymer pour point depressant are used in COMPARATIVE EXAMPLE 12 is prepared. The KV, CCS, MRV and TP-1 of this oil composition are determined, and the results are set forth in Table 3.

COMPARATIVE EXAMPLE 14

An ethylene-propylene copolymer having an ethylene content of about 56%, an $\overline{M}_w$ of about 130,000, an $\overline{M}_n$ of about 81,000, a $\overline{M}_w/\overline{M}_n$ of about 1.60, a $\overline{M}_z/\overline{M}_w$ of about 1.30, a Shear Stability Index (SSI) of about 30%, and a Thickening Efficiency (T.E.) of about 2.4 is prepared in a tubular reactor under the following conditions:

| | |
|---|---|
| Reactor Inlet Temp. (°F.) | 33 |
| Reactor Outlet Temp. (°F.) | 99 |
| Sidestream Feed Temp. (°F.) | 23 |
| Catalyst Premix Temp. (°F.) | 48 |
| Reactor Residence Time (Sec.) at Sidestream 1/2/3/4/5 | 0.56/1.0/1.1/1.22/1.34 |
| Inlet Feed Rates (Klb./hr.) | |
| Hexane | 139 |
| Ethylene | 0.49 |
| Propylene | 5.57 |
| VCl$_4$ | 0.039 |
| Al$_2$(C$_2$H$_5$)$_3$Cl$_3$ | 1.26 |

| | |
|---|---|
| Sweep Hexane | 6.5 |
| Sidestream Feed Rates (Klb./hr.) | |
| Hexane | 61 |
| Ethylene | 4.1 |
| Propylene | 7.1 |
| Total Hexane (Klb./hr.) | 206 |
| Sidestream Feed Splits (wt. %) | |
| Sidestream 1/2/3/4/5 | 10.9/31.2/15/17.7/24.7 |

A portion of this undegraded ethylene-propylene copolymer is tested to determine its efficacy as a viscosity index improver additive. A lubricating oil composition of SAE 10W40 viscosity grade containing 0.90 wt. % of this undegraded ethylene-propylene copolymer. 11.20 wt. % of the same determined inhibitor package as used in COMPARATIVE EXAMPLE 12, and 0.21 wt. % of the same fumarate vinyl acetate copolymer pour point depressant as used in COMPARATIVE EXAMPLE 11 is prepared. The KV, CCS, MRV and TP-1 of this oil composition are determined, and the results are set forth in Table 3.

EXAMPLE 15

The remaining portion, about 500 grams, of the undegraded copolymer of COMPARATIVE EXAMPLE 14 is degraded in molecular weight to a T.E. of about 2.04 by masticating in a laboratory masticator under an air atmosphere at 150° C. for about three and three quarter hours.

The SSI of this degraded copolymer is determined to be about 25%. A lubricating oil composition of 10W40 viscosity grade containing 1.10 wt. % of this degraded ethylene-propylene copolymer, 11.20 wt. % of the same detergent inhibitor package as in COMPARATIVE EXAMPLE 12, and 0.21 wt. % of the same fumarate vinyl acetate copolymer pour point depressant as used in COMPARATIVE EXAMPLE 12 is prepared. The KV, CCS, MRV and TP-1 of this oil composition are determined, and the results are set forth in Table 3.

COMPARATIVE EXAMPLE 16

This example illustrates a conventional ethylene-propylene copolymer falling outside the scope of the instant invention which does not have the narrow MWD of the ethylene-propylene copolymers utilized in the present invention. This conventional ethylene-propylene copolymer has a $\overline{M}_n$ of about 80,000, a $\overline{M}_w$ of about 153,000, a $\overline{M}_w/\overline{M}_n$ of about 1.91, a $\overline{M}_z/\overline{M}_w$ of about 1.88, an ethylene content of about 44%, a T.E. of about 2.8, and a SSI of about 50%. A lubricating oil composition of SAE 10W40 viscosity grade containing 0.85 wt. % of this conventional ethylene-propylene copolymer, 11.20 wt. % of the same detergent inhibitor package used in COMPARATIVE EXAMPLE 12, and 0.21 wt. % of the same fumarate vinyl acetate copolymer pour point depressant as used in COMPARATIVE EXAMPLE 12 is prepared. The KV, CCS, MRV and TP-1 of this oil composition are determined, and the results are set forth in Table 3.

TABLE 3

| | T.E. | SSI (%) | KV at 100° C. (cSt) | CCS at −20° C. (cP) | MRV at −25° C. (cP) | TP-1 at 25° C. (cP) |
|---|---|---|---|---|---|---|
| Comparative Example 12 | 3.45 | 50 | 14.52 | 3650 | 12,000 | 12,200 |
| Example 13 | 2.0 | 25 | 14.95 | 3700 | 15,900 | 19,800 |
| Comparative Example 14 | 2.4 | 30 | 14.51 | 3650 | 14,300 | 21,500 |
| Example 15 | 2.04 | 25 | 15.09 | 3770 | 16,300 | 18,300 |

TABLE 3-continued

| | T.E. | SSI (%) | KV at 100° C. (cSt) | CCS at −20° C. (cP) | MRV at −25° C. (cP) | TP-1 at 25° C. (cP) |
|---|---|---|---|---|---|---|
| Comparative Example 16 | 2.8 | 50 | 14.62 | 4020 | 20,600 | 21,400 |

COMPARATIVE EXAMPLE 17

This example illustrates a conventional ethylene-propylene copolymer falling outside the scope of the instant invention which does not have the narrow MWD of the ethylene-propylene copolymers utilized in the present invention. This conventional ethylene-propylene copolymer has a $\overline{M}_n$ of about 80,000, a $\overline{M}_w$ of about 153,000, a $\overline{M}_w/\overline{M}_n$ of about 1.91, a $\overline{M}_z/\overline{M}_w$ of about 1.88, an ethylene content of about 44%, a T.E. of about 2.8, and a SSI of about 50%. A lubricating oil composition of SAE 5W30 viscosity grade containing this conventional ethylene-propylene copolymer and 2.0 wt. % fumarate vinyl acetate copolymer pour point depressant is prepared. The amount of this conventional ethylene-propylene copolymer dissolved in the lubricating oil is an amount effective to provide a lubricating oil composition having a KV at 100° C. of 10 centistokes. The CCS of this oil composition is determined, and the results are set forth in Table 4.

COMPARATIVE EXAMPLES 18-19

The copolymer of COMPARATIVE EXAMPLE 17 is degraded in molecular weight. This degradation comprises degrading the copolymer under an air atmosphere in a commercial masticator at a temperature of 176° C. for a period of about 3 to 3.5 hours.

During the course of the degradation reaction two different samples of degraded copolymer are withdrawn from the reactor at different stages of the reaction. These samples are identified as Comparative Examples 18-19 in Table 4. The T.E. and SSI of these degraded copolymer samples are determined and the results are set forth in Table 1. Furthermore, mineral oil solutions of SAE 5W30 quality containing these degraded copolymer samples are prepared to determine the effectiveness of these degraded copolymers as viscosity index improver additives. These mineral oil solutions are prepared by dissolving in mineral oil an amount of degraded copolymer sufficient to provide a mineral oil solution having a KV at 100° C. of 10 centistokes. These mineral oil solutions also all contain 0.2 wt. % of fumarate vinyl acetate copolymer pour point depressant. The CCS of these mineral oil solutions is determined and the results set forth in Table 4 as "Comparative Examples 18-19" respectively.

TABLE 4

| | T.E. | SSI (%) | KV at 100° C. (cSt) | CCS at −20° C. (cP) |
|---|---|---|---|---|
| Comparative Example 17 | 2.8 | 50 | 10 | 2120 |
| Comparative Example 18 | 1.8 | 30 | 10 | 2360 |
| Comparative Example 19 | 1.4 | 18 | 10 | 2760 |

As illustrated by the data in Tables 1-3, mild degradation of the ethylene-propylene copolymers having narrow MWD does not significantly affect their ability to provide lube oil compositions exhibiting good CCS. Thus, for example, as illustrated by the data in Tables 1-2 lubricating oil compositions containing mildly degraded copolymers (Examples 2-4 and 9-11) exhibit substantially the same CCS as a lubricating oil composition containing the undegraded copolymer (Comparative Examples 1 and 7). Furthermore, as illustrated by the data in Table 1, even the substantially degraded copolymers of the instant invention (Examples 5-6) provide lubricating oil compositions exhibiting better or improved CCS than lubricating oil compositions containing undegraded conventional non-narrow MWD ethylene-propylene copolymers (Comparative Example 7). Also, as further illustrated by the data in Table 3, lubricating oil compositions containing the degraded copolymers of the instant invention (Examples 13 and 15) exhibit better CCS than a lube oil composition containing a conventional non-narrow MWD non-degraded ethylene-propylene copolymer (Comparative Example 16).

For purposes of the present invention, mild degradation is a degree of degradation of an ethylene copolymer resulting in a degraded copolymer which provides an oil composition having a CCS which is not more than 10% (10% of less) greater than the CCS of an oil composition containing the undegraded copolymer. Substantial degradation is a degree of degradation resulting in a degraded copolymer which provides an oil composition having a CCS more than 10% greater than the CCS of an oil composition containing the undegraded copolymer. Thus, for example the degraded copolymer of Example 3 is mildly degraded since the difference in CCS between oil compositions containing said degraded copolymer and the undegraded copolymer of Comparative Example 1 is 10% or less (1.96%). On the other hand, the degraded copolymer of Example 6 is substantially degraded since the difference in CCS between oil composition containing said degraded copolymer and the undegraded copolymer of Comparative Example 1 is more than 10% (18.4%).

The data in Table 4 illustrates that degradation of conventional non-narrow MWD ethylene-propylene copolymers does have a significant deleterious affect on the CCS of lube oil compositions containing these degraded copolymers vis-a-vis lube oil composition containing such conventional non-degraded copolymers.

EXAMPLE 20

This example illustrates a maleic anhydride grafted degraded ethylene-propylene copolymer of the instant invention.

An ethylene-propylene copolymer having an ethylene content of about 56 wt. %, a thickening efficiency (T.E.) of about 2.6, an SSI of about 26%, an $\overline{M}_w$ of about 111,000, an $\overline{M}_n$ of about 70,000, a $\overline{M}_w/\overline{M}_n$ of about 1.6, and a $\overline{M}_z/\overline{M}_w$ of about 1.27, is prepared in a tubular reactor under the following conditions:

| | |
|---|---|
| Reactor Inlet Temp. (°F.) | 33 |
| Reactor Outlet Temp. (°F.) | 99 |
| Sidestream Feed Temp. (°F.) | 23 |
| Catalyst Premix Temp. (°F.) | 48 |
| Reactor Residence Time (Sec.) at Sidestream 1/2/3/4/5 | 0.56/1.01/1.1/1.22/1.34 |
| Inlet Feed Rates (Klb./hr ) | |

| -continued | |
|---|---|
| Hexane | 39 |
| Ethylene | 0.49 |
| Propylene | 5.57 |
| VCl₄ | 0.039 |
| Al₂(C₂H₅)₃Cl₃ | 1.26 |
| Sweep Hexane | 6.5 |
| Sidestream Feed Rates (Klb./hr.) | |
| Hexane | 61 |
| Ethylene | 4.1 |
| Propylene | 7.1 |
| Total Hexane (Klb./hr.) | 206 |
| Sidestream Feed Splits (wt. %) | |
| Sidestream 1/2/3/4/5 | 10.9/31.2/15/17.7/24.7 |

About 500 grams of copolymer are masticated under an air atmosphere at 150° C. for a period of about 2 hours in a laboratory masticator. The resultant degraded copolymer has a T.E. of about 1.5, a SSI of about 12%, an $\overline{M}_w$ of about 71,300 and a $\overline{M}_z/\overline{M}_w$ of about 1.52.

Sixty grams of this degraded copolymer are dissolved in 240 grams of S100NLP mineral oil in a 500 ml reactor flask under a nitrogen atmosphere while heating to 175° C. to make a 20 wt. % copolymer solution. Six grams of maleic anhydride are charged to the reactor in 4 equal portions, each portion consisting of 1.5 grams of maleic anhydride. After each charge of maleic anhydride 0.15 gram of di-t-butyl peroxide initiator are charged to the reactor (total charge amount of di-t-butyl peroxide charged to the reactor is 0.6 gram). The resulting reaction mixture is reacted at 170° C. under a nitrogen atmosphere for ½ hour. The reaction mixture is then stripped with nitrogen for 15 minutes to remove remaining unreacted maleic anhydride. The maleic anhydride functionality (total acidity) is determined to be 0.107 meq/g. by standard acid-base titration. The SSI of the grafted degraded ethylene-propylene copolymer is determined to be 12.29%.

A SAE 10W40 quality lubricating oil composition containing 7.8 wt. % of the grafted reaction product composition obtained as described above and a conventional detergent inhibitor package is prepared. The KV, CCS, and MRV of this lubricating oil composition are determined and the results are set forth in Table 5.

COMPARATIVE EXAMPLE 21

This Comparative Example illustrates a conventional non-narrow MWD ethylee-propylene copolymer falling outside the scope of the instant invention which is degraded and then grafted with maleic anhydride.

A conventional ethylene propylene copolymer falling outside the scope of the instant invention having a Thickening Efficiency of about 2.8, a SSI of about 50%, an ethylene content of about 44%, a $\overline{M}_n$ of about 80,000, a $\overline{M}_w$ of 153,000, a $\overline{M}_w/\overline{M}_n$ of about 1.91, and $\overline{M}_z/\overline{M}_w$ of about 1.88 is degraded substantially in accordance with the procedure of Example 19. The degraded copolymer has a T.E. of about 1.20, a SSI of about 13%, a $\overline{M}_n$ of about 33,000, a $\overline{M}_w$ of about 62,000, a $\overline{M}_w/\overline{M}_n$ of about 1.88, and a $\overline{M}_z/\overline{M}_w$ of about 1.78.

This degraded copolymer is then grafted with maleic anhydride substantially in accordance with the procedure of Example 20. The maleic anhydride functionality (total acidity) of the grafted degraded copolymer is determined to be 0.098 meq./g. by standard acid-base titration, and its SSI is determined to be 13.23%. A SAE 10W40 quality lubricating oil composition containing 11.0 wt. % of the grafted reaction product composition obtained as described above and the same type and amount of conventional detergent inhibitor package as used in Example 20 is prepared. The KV, CCS, and MRV of this lubricating oil composition are determined and the results are set forth in Table 5.

TABLE 5

| | KV at 100° C. (cSt) | CCS (cP) | MRV (cP) |
|---|---|---|---|
| Example 19 | 14.74 | 2864 | 14,074 |
| Comparative Example 20 | 14.02 | 3284 | 21,981 |

EXAMPLE 22

Into a reactor vessel are placed 150 grams of the succinic anhydride grafted degraded ethylene-propylene reaction product composition (grafted copolymer in oil solution) prepared in accordance with the procedure of Example 20. This solution is then heated to 175° under a nitrogen atmosphere. Into this reactor vessel are added 42 grams of a 50/50 solution of polyisobutenyl succinic anhydride (having a functionality of about 1.05, a polyisobutene $\overline{M}_n$ of about 950, a Saponification Number of 112, and containing about 12% unreacted polyisobutene) and S150NLP mineral oil. The resulting reaction mixture is stirred for 30 minutes. Then 1.75 grams of diethylene triamine are added to the reaction mixture over a 5-minute period. This reaction mixture is then heated at 175° C. for a period of time. The reaction mixture is then stripped with nitrogen for 30 minutes. After stripping of the reaction mixture, 1 gram of dodecenyl succinic anhydride is added to the reaction mixture, and the reaction mixture is soaked for 30 minutes. Sufficient S100NLP mineral oil is added to the reaction mixture to provide a solution having a KV at 100° C. of 10.70 centistokes. The SSI of the nitrogen containing grafted degraded ethylene-propylene copolymer is determined to be 21.3%.

A 10W40 quality lubricating oil composition containing 13.25 wt. % of the diluted reaction product containing composition prepared as described above and a conventional detergent inhibitor package is prepared. The KV, CCS, MRV and TP-1 of this lubricating oil composition are determined and the results are set forth in Table 6.

COMPARATIVE EXAMPLE 23

This Comparative Example illustrates a conventional non-narrow MWD ethylene-propylene copolymer falling outside the scope of the instant invention which is degraded, grafted with maleic anhydride and then reacted with diethylene triamine.

A conventional ethylene propylene copolymer falling outside the scope of the instant invention having a Thickening Efficiency of about 2.8, a SSI of about 50%, an ethylene content of about 44%, a $\overline{M}_n$ of about 80,000, a $\overline{M}_w$ of about 153,000, a $\overline{M}_w/\overline{M}_n$ of about 1.91, and $\overline{M}_z/\overline{M}_w$ of about 1.88 is degraded substantially in accordance with the procedure of Example 19. The degraded copolymer has a T.E. of about 1.20, a $\overline{M}_n$ of about 33,000, a $\overline{M}_w$ of about 62,000, a $\overline{M}_w/\overline{M}_n$ of about 1.88, and a $\overline{M}_z/\overline{M}_w$ of about 1.78.

This degraded copolymer is then grafted with maleic anhydride substantially in accordance with the procedure of Example 20. The maleic anhydride functionality (total acidity) of the grafted degraded copolymer is determined to be 0.098 meq./g. by standard acid-base titration.

Into a reactor vessel are placed 150 grams of the succinic anhydride grafted degraded ethylene-propylene reaction product composition (grafted copolymer in oil solution). This solution is then heated to 175° C. under a nitrogen atmosphere. Into this reaction vessel are added 42 grams of a 50/50 solution of polyisobutenyl succinic anhydride (having a functionality of about 1.04, a polyisobutene $\overline{M}_n$ of about 950, a Saponification Number of 112, and containing about 12% unreacted polyisobutene) and S150NLP mineral oil. The resulting reaction mixture is stirred for 30 minutes. Then 1.75 grams of diethylene triamine are added to the reaction mixture over a 5-minute period. This reaction mixture is then heated for a period of time. The reaction mixture is then stripped with nitrogen for 30 minutes. After stripping of the reaction mixture, 1gram of dodecenyl succinic anhydride is added to the reaction mixture, and the reaction mixture is soaked for 30 minutes. Sufficient S100NLP mineral oil is added to the reaction mixture to provide a solution having a KV at 100° C. of 10.06 centistokes. The SSI of the nitrogen containing grafted degraded ethylene-propylene copolymer is determined to be 23.7%.

A 10W40 quality lubricating oil composition containing 13 wt. % of the diluted reaction product containing composition prepared as described above and the same amount and type of conventional detergent inhibitor package as used in Example 22 is prepared. The KV, CCs, MRV and TP-1 of this lubricating oil composition are determined, and the results are set forth in Table 6.

TABLE 6

| | KV at 100° C. (cSt) | CCS (cP) | MRV (cP) | TP-1 (cP) |
|---|---|---|---|---|
| Example 21 | 14.38 | 3001 | 13,272 | 11,991 |
| Comparative Example 22 | 14.53 | 3691 | 23,345 | 20,357 |

As illustrated by the data in Tables 5 and 6, the succinic anhydride grafted degraded ethylene-propylene copolymers (Example 20) and the nitrogen containing succinic anhydride grafted degraded ethylene copolymers (Example 22) of the instant invention provide lubricating oil compositions exhibiting improved or better low temperature viscometric properties (CCS, MRV and TP-1) than conventional succinic anhydride grafted degraded ethylene-propylene copolymers (Comparative Example 21) and conventional nitrogen containing succinic anhydride grafted degraded ethylene-propylene copolymers (Comparative Example 23) falling outside the scope of the instant invention.

What is claimed is:

1. Oil soluble molecular weight degraded ethylene-α-olefin copolymer useful as a viscosity modifier for oleaginous compositions obtained by degrading undegraded copolymer of ethylene and at least one other α-olefin monomer, said undegraded copolymer comprising intramolecularly heterogeneous copolymer chains containing at least one crystallizable segment of methylene units and at least one low crystallinity ethylene-α-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene.

2. The degraded ethylene-α-olefin copolymer according to claim 1 wherein said degrading comprises mechanical degradation.

3. The degraded ethylene-α-olefin copolymer according to claim 2 wherein said mechanical degradation comprises shear assisted oxidative degradation.

4. The degraded ethylene-α-olefin copolymer according to claim 2 wherein said mechanical degradation comprises shear assisted degradation carried out in an inert atmosphere.

5. The degraded ethylene-α-olefin copolymer according to claim 3 wherein said shear assisted oxidative degradation is carried out in the presence of catalysts.

6. The degraded ethylene-α-olefin copolymer according to claim 4 wherein said shear assisted degradation is carried out in the presence of catalyst.

7. The degraded ethylene-α-olefin copolymer according to claim 1 wherein said degradation comprises thermal degradation.

8. The degraded ethylene-α-olefin copolymer according to claim 7 wherein said thermal degradation is carried out in the presence of oxygen.

9. The degraded ethylene-α-olefin copolymer according to claim 8 wherein said thermal degradation is carried out in the presence of catalyst.

10. The degraded ethylene-α-olefin copolymer according to claim 7 wherein said thermal degradation is carried out in an inert atmosphere.

11. The degraded ethylene-α-olefin copolymer according to claim 7 wherein said thermal degradation is carried out in the presence of catalyst.

12. The degraded ethylene-α-olefin copolymer according to claim 2 wherein said degradation comprises homogenization.

13. The degraded ethylene-α-olefin copolymer according to claim 1 wherein said undegraded copolymer of ethylene and at least one other α-olefin has an intermolecular compositional dispersity such that 95 weight % of said copolymer chains have a composition 15 weight % or less different from the average copolymer ethylene composition.

14. The degraded ethylene-α-olefin copolymer according to claim 13 wherein said low crystallinity segment comprises from about 20 to 53 wt. % ethylene.

15. The degraded ethylene-α-olefin copolymer according to claim 14 wherein said crystallizable segment comprises at least about 57 wt. % ethylene.

16. The degraded ethylene-α-olefin copolymer according to claim 1 wherein said undegraded copolymer of ethylene and at least one other α-olefin has a MWD characterized by at least one of a ratio of $\overline{M}_w/\overline{M}_n$ of less than about 1.5 and a ratio of $\overline{M}_z/\overline{M}_w$ of less than about 1.5.

17. The degraded ethylene-α-olefin copolymer according to claim 16 wherein said undegraded copolymer of ethylene and at least one other α-olefin has a MWD characterized by at least one of a ratio of $\overline{M}_w/\overline{M}_n$ of less than about 1.25 and a ratio of $\overline{M}_z/\overline{M}_w$ of less than about 1.2.

18. The degraded ethylene-α-olefin copolymer according to claim 16 wherein the intermolecular compositional dispersity of said undegraded copolymer of ethylene and at least one other α-olefin is such that 95 weight % of said copolymer chains have a composition 13 weight % or less different from the average copolymer ethylene composition.

19. The degraded ethylene-α-olefin copolymer according to claim 18 wherein said low crystallinity segment of said undegraded copolymer of ethylene and at least one other α-olefin comprises from about 30 to 50 weight % ethylene.

20. The degraded ethylene-α-olefin copolymer according to claim 1 wherein said undegraded copolymer of ethylene and at least one other α-olefin has a total minimum ethylene content of about 20 % on a weight basis.

21. The degraded ethylene-α-olefin copolymer according to claim 1 wherein said undegraded copolymer of ethylene and at least one other α-olefin comprises chain segment sequence characterized by at least one of the structures:

$$M—T \quad (I)$$

$$T^1—(M—T^2)_x \quad (II)$$

$$T^1—(M^1—T^2)_y—M^2 \quad (III)$$

wherein x and y are each integers of 1 to 3, M comprises said crystallizable segment, T comprises said low crystallinity segment $M^1$ and $M^2$ are the same or different and each comprises an M segment, and $T^1$ and $T^2$ are the same or different and each comprises a T segment.

22. The degraded ethylene-α-olefin copolymer according to claim 21 wherein said chain sequences are characterized by structure I.

23. The degraded ethylene-α-olefin copolymer according to claim 21 wherein said chain segment sequences are characterized by structure II.

24. The degraded ethylene-α-olefin copolymer according to claim 23 wherein x is one.

25. The degraded ethylene-α-olefin copolymer according to claim 24 wherein in said chain segment sequences said $T^1$ and $T^2$ segments are of substantially the same weight-average molecular weight.

26. The degraded ethylene-α-olefin copolymer according to claim 25 wherein in said chain segment sequences the sum of the weight average molecular weights of said $T^1$ and $T^2$ segments is substantially equal to the weight-average molecular weight of said M segment.

27. The degraded ethylene-α-olefin copolymer according to claim 1 wherein said undegraded copolymer of ethylene and at least one other alpha-olefin copolymer has a total ethylene content of greater than about 35% on a weight basis.

28. A lubricating composition exhibiting improved low temperature viscomeric properties containing (1) lubricating oil, and (2) the degraded ethylene-α-olefin copolymer of claim 1.

29. The lubricating composition according to claim 28 containing a major amount of (1) and a minor amount of (2).

30. The lubricating composition according to claim 29, wherein said composition contains a viscosity improving effective amount of (2).

31. The lubricating composition according to claim 30 which contains from about 0.001 to about 20 wt. % of (2).

32. The lubricating composition according to claim 31 which contains from about 0.01 to about 15 wt. % of (2).

33. The lubricating composition according to claim 32 which contains from about 0.1 to 10 wt. % of (2).

34. The lubricating composition according to claim 29 wherein said lubricating composition is a lubricating oil concentrate containing from abut 2 to about 49 wt. % of (2).

* * * * *